(12) United States Patent
von der Embse

(10) Patent No.: US 7,855,995 B1
(45) Date of Patent: Dec. 21, 2010

(54) QLM MAXIMUM LIKELIHOOD DEMODULATION

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 0 days.

(21) Appl. No.: 12/380,668

(22) Filed: Mar. 3, 2009

Related U.S. Application Data

(63) Continuation-in-part of application No. 12/069,418, filed on Feb. 11, 2008.

(51) Int. Cl.
    *H04Q 7/00*    (2006.01)
(52) U.S. Cl. ........................................ 370/335; 375/324
(58) Field of Classification Search ................ 370/335, 370/342, 206
    See application file for complete search history.

(56) References Cited

U.S. PATENT DOCUMENTS

| | | | |
|---|---|---|---|
| 6,426,723 B1 | 7/2002 | Smith | |
| 6,504,506 B1 | 1/2003 | Thomas | |
| 6,636,568 B2 | 10/2003 | Kadous | |
| 6,647,078 B1 | 11/2003 | Thomas | |
| 6,674,712 B1 | 1/2004 | Yang | |
| 6,728,517 B2 | 4/2004 | Sugar | |
| 6,731,618 B1 | 5/2004 | Chung | |
| 6,731,668 B2 | 5/2004 | Ketchum | |
| 6,798,737 B1 | 9/2004 | Dabak | |
| 6,856,652 B2 | 2/2005 | West et al. | |
| 7,010,048 B1 | 3/2006 | Shattil | |
| 7,079,567 B2 | 7/2006 | van Nee | |
| 7,277,382 B1 | 10/2007 | von der Embse | |
| 7,337,383 B1 | 2/2008 | von der Embse | |
| 7,352,796 B1 | 4/2008 | von der Embse | |
| 7,376,688 B1 | 5/2008 | von der Embse | |
| 7,391,819 B1 | 6/2008 | von der Embse | |
| 7,394,792 B1 | 7/2008 | von der Embse | |
| 2001/0030989 A1* | 10/2001 | Arambepola ................. 375/139 |
| 2002/0118766 A1* | 8/2002 | Mitlin et al. ................. 375/261 |
| 2002/0126650 A1* | 9/2002 | Hall et al. .................... 370/349 |
| 2003/0118121 A1* | 6/2003 | Makinen ...................... 375/261 |
| 2004/0101071 A1* | 5/2004 | Naito .......................... 375/340 |
| 2007/0025235 A1* | 2/2007 | Rasmussen et al. ......... 370/208 |
| 2007/0291635 A1* | 12/2007 | Yang et al. .................. 370/208 |
| 2007/0291639 A1* | 12/2007 | Jacobsen et al. ............. 370/208 |
| 2008/0279303 A1* | 11/2008 | Wengerter et al. .......... 375/295 |
| 2009/0175377 A1* | 7/2009 | Iwai et al. ................... 375/295 |

OTHER PUBLICATIONS

U.S. Appl. No. 10/806,016, filed Jan. 23, 2004, von der Embse.

(Continued)

*Primary Examiner*—Andrew Lee

(57) ABSTRACT

The invention provides a method for implementing demodulation of quadrature layered modulation (QLM) communications using maximum likelihood (ML) demodulation algorithms which limit the demodulation loss. QLM layers communications channels over the same bsndwidth and with a differentiating parameter for each layer which enables a demodulation algorithm to recover the data symbols in each layer. QLM supports higher data rates than allowed by the Shannon bound. QLM demodulation algorithms are trellis symbol algorithms, trellis bit algorithms, ML algorithms, and other equivalent algorithms. Trellis algorithms rapidly increase in complexity with the number of layers of communications and with the order of the modulation. ML algorithms are less complex but have demodulation losses which rapidly increase with the number of data symbols. ML demodulation architectures disclosed in this invention limit these losses and are suitable to implement QLM for higher order modulations and for more layers of communications.

6 Claims, 35 Drawing Sheets

OTHER PUBLICATIONS

U.S. Appl. No. 11/131,464, filed May 18, 2005, von der Embse.
U.S. Appl. No. 12/069,418, filed Feb. 11, 2008, von der Embse.
U.S. Appl. No. 12/151,986, filed May 12, 2008, von der Embse.
U.S. Appl. No. 12/152,318, filed May 13, 2008, von der Embse.

* cited by examiner

For satellite-ground communications links:

21  $E_b/N_o = [EIRP \, G_R / 4\pi R^2 \, kT \, (Loss)] / R_b$ $= [o] / R_b$

22  QLM Impact on the required communications link power [o]:

$\Delta[o] = + 6 \text{ dB}$   for $n_p=2 \times R_b$ $= + 12 \text{ dB}$   for $n_p=4 \times R_b$

FIG. 3

25  1) New Nyquist data symbol rate $= n_p/T_s$ 26  2) New bound on capacity C and information rate "b"

$C = \max\{ n_p B \, \log_2(1+(S/N)/n_p{}^\wedge 2) \}$ Bps, over $n_p$ $b = C/B$    bits/( symbol interval $T_s=1/B$ )

$= \max\{ n_p \, \log_2(1+(S/N)/n_p{}^\wedge 2) \}$    over $n_p$ $= \eta$    Bps/Hz    communication efficiency 27  3) $BT_s = 1+\alpha$  where $\alpha$ is the excess bandwidth $= 1$  using a QLM Wavelet waveform

FIG. 4

$$H^{110} = (n_s-1)n_p+1 \times (n_s-1)n_p+1 \text{ matrix for 4-filter } (n_s=4) \text{ group with } n_p=4 \text{ layers}$$

$$= 13 \times 13 \text{ correlation matrix}$$

$$= \begin{bmatrix}
1 & 3/4 & 1/2 & 1/4 & 0 & 0 & 0 & 0 & 0 & 0 & 0 & 0 & 0 \\
3/4 & 1 & 3/4 & 1/2 & 1/4 & 0 & 0 & 0 & 0 & 0 & 0 & 0 & 0 \\
1/2 & 3/4 & 1 & 3/4 & 1/2 & 1/4 & 0 & 0 & 0 & 0 & 0 & 0 & 0 \\
1/4 & 1/2 & 3/4 & 1 & 3/4 & 1/2 & 1/4 & 0 & 0 & 0 & 0 & 0 & 0 \\
0 & 1/4 & 1/2 & 3/4 & 1 & 3/4 & 1/2 & 1/4 & 0 & 0 & 0 & 0 & 0 \\
0 & 0 & 1/4 & 1/2 & 3/4 & 1 & 3/4 & 1/2 & 1/4 & 0 & 0 & 0 & 0 \\
0 & 0 & 0 & 1/4 & 1/2 & 3/4 & 1 & 3/4 & 1/2 & 1/4 & 0 & 0 & 0 \\
0 & 0 & 0 & 0 & 1/4 & 1/2 & 3/4 & 1 & 3/4 & 1/2 & 1/4 & 0 & 0 \\
0 & 0 & 0 & 0 & 0 & 1/4 & 1/2 & 3/4 & 1 & 3/4 & 1/2 & 1/4 & 0 \\
0 & 0 & 0 & 0 & 0 & 0 & 1/4 & 1/2 & 3/4 & 1 & 3/4 & 1/2 & 1/4 \\
0 & 0 & 0 & 0 & 0 & 0 & 0 & 1/4 & 1/2 & 3/4 & 1 & 3/4 & 1/2 \\
0 & 0 & 0 & 0 & 0 & 0 & 0 & 0 & 1/4 & 1/2 & 3/4 & 1 & 3/4 \\
0 & 0 & 0 & 0 & 0 & 0 & 0 & 0 & 0 & 1/4 & 1/2 & 3/4 & 1
\end{bmatrix}$$

1) N-chip complex Walsh code $\underline{W}$ components are lexiographically reordered real Walsh W codes $$\underline{W}(c) = Nx1 \text{ complex Walsh code vector } c$$
$$= W(cr) + j W(ci) \quad \text{for real Walsh codes indexed on } cr, ci$$

where

| $c = 0$ | $cr = 0$ | $ci = 0$ |
|---|---|---|
| $c = 1:N/2-1$ | $cr = 2c$ | $ci = 2c-1$ |
| $c = N/2$ | $cr = N-1$ | $ci = N-1$ |
| $c = N/2+1:N-1$ | $cr = N-1-2x1:N/2-1$ | $cr = N-2x1:N/2-1$ |

151

2) 8x8 complex Walsh code matrix $\underline{W}_8$ $$\underline{W}_8 * (1-j)/\sqrt{2} = \begin{bmatrix} 1 & 1 & 1 & 1 & 1 & 1 & 1 & 1 \\ 1 & j & -1 & -j & 1 & j & -1 & -j \\ 1 & -1 & 1 & -1 & 1 & -1 & 1 & -1 \\ 1 & -j & -1 & j & 1 & -j & -1 & j \\ 1 & 1 & 1 & 1 & -1 & -1 & -1 & -1 \\ 1 & j & -1 & -j & -1 & -j & 1 & j \\ 1 & -1 & 1 & -1 & -1 & 1 & -1 & 1 \\ 1 & -j & -1 & j & -1 & j & 1 & -j \end{bmatrix} \quad 152$$

152

3) Generalized complex Walsh codes $\underline{W}$=Tensor product of Complex Walsh, DFT, other codes

FIG. 28

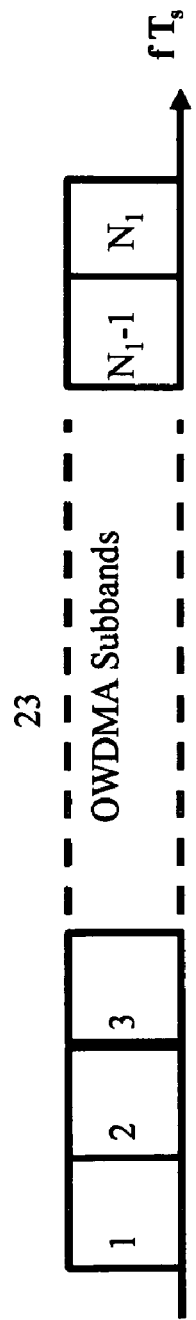
1) CDMA frequency band
2) MS CDMA uses OWDMA to generate $N_1$ subbands over the N chip CDMA band wherein $N=N_0N_1$ chip complex Walsh code with $N_0$ chips/subband
FIG. 30

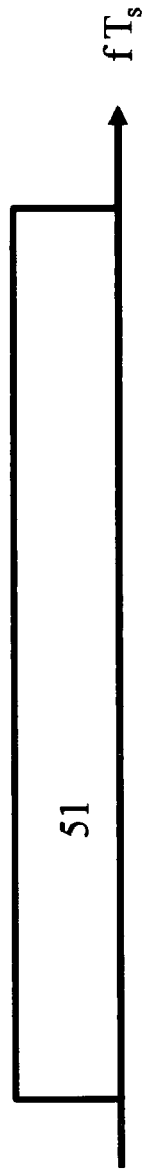
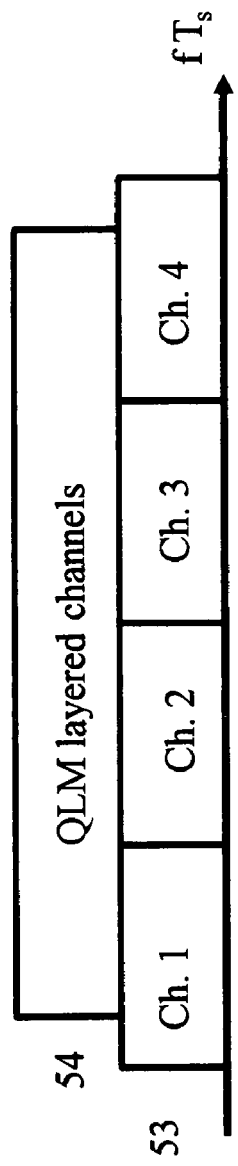
1) Single ADSL channel
2) QLM ML mode for ADSL channel with 256QAM (6 bits) TCM data symbols
QLM ML 4-filter architecture using 8PSK with $n_p = 16$ layers yields 4 × (data rate of ADSL channel) with MS complex Walsh code option
FIG. 32

1) 1.25 MHz frequency band

2) CDMA 1.25 MHz frequency band = 20 MHz/16 = 1 CDMA channel

QLM ML  4-filter group using  8PSK with  $n_p$=16 layers  yields
   (16x3+1)/4 x 1.25 MHz  x 2 bits/symbol = 30.6 Mbps 3) WiFi 1.25 MHz frequency band= 4 x 20 MHz/64 point FFT = 4 WiFi tones QLM ML  4-filter group using  64QAM with  $n_p$=8 layers yields
   (8x3+1)/4 x 1.25 MHz  x 4 bits/symbol = 31.3 Mbps

QLM MAXIMUM LIKELIHOOD DEMODULATION

This patent filing is a continuation in part of application Ser. No. 12/069,418 filed on Feb. 11, 2008.

BACKGROUND OF THE INVENTION

I. Field of the Invention

The present invention relates to the Shannon bound on communications capacity and also relates to symbol modulation and demodulation for high-data-rate wired, wireless, and optical communications and includes the symbol modulations phase-shift-keying PSK, quadrature amplitude modulation QAM, bandwidth efficient modulation BEM, gaussian minimum shift keying GMSK, pulse position modulation PPM, and the plurality of current and future modulations for single links and multiple access links which include time division multiple access TDMA, orthogonal frequency division multiple access OFDMA, code division multiple access CDMA, spatial division multiple access SDMA, frequency hopping FH, optical wavelength division multiple access WDMA, orthogonal Wavelet division multiple access OWDMA, combinations thereof, and the plurality of radar, optical, laser, spatial, temporal, sound, imaging, and media filings. Communication filing examples include electrical and optical wired, mobile, point-to-point, point-to-multipoint, multipoint-to-multipoint, cellular, multiple-input multiple-output MIMO, and satellite communication networks.

II. Description of the Related Art

The Shannon bound is the Shannon capacity theorem for the maximum data rate C and equivalently can be restated as a bound on the corresponding number of modulation bits per symbol as well as a bound on the communications efficiency and is complemented by the Shannon coding theorem. From Shannon's paper "A Mathematical Theory of Communications" Bell System Technical Journal, 27:379-423, 623-656, October 1948 and B. Vucetic and J. Yuan's book "Turbo Codes", Kluwer Academic Publishers 2000, the Shannon (Shannon-Hartley theorem) capacity theorem, the corresponding Shannon bound on the information bits b per symbol, the Shannon bound on the communications efficiency $\eta$, and the Shannon coding theorem can be written as equations (1).

Shannon bounds and coding theorem (1)

1 Shannon capacity theorem $$C = B \log_2(1 + S/N)$$

= Channel capacity in bits/seconds = Bps for an additive white Gaussian noise AWGN channel with bandwidth $B$ wherein "$\log_2$"

is the logarithm to the base 2

= Maximum rate at which information can be reliablity transmitted over a noisy channel where $S/N$ is the signal-to-noise ratio in $B$ 2 Shannon bound on b, $\eta$, and $E_b/N_o$ $$\max\{b\} = \max\{C/B\}$$

$$= \log_2(1 + S/N)$$

$$= \max(\eta)$$

$$E_b/N_o = [2^{\max\{b\}} - 1]/\max\{b\}$$

wherein
  b=C/B, Bps/Hz=Bits/symbol
  $\eta$=b/$T_s$B, Bps/Hz
  $T_s$=symbol interval 3. Shannon coding theorem for the information bit rate $R_b$ For $R_b$<C there exists codes which support reliable communications For $R_b$>C there are no codes which support reliable communications Using the assumption that the symbol rate $1/T_s$ is maximized which means $1/T_s$=(Nyquist rate)=bandwidth B and is equivalent to $T_sB=1$, enables 1 in equations (1) defining C to be rewritten to calculate max{b} as a function of the signal-to-noise ratio S/N, and to calculate $E_b/N_o$ which is the ratio of energy per information bit $E_b$ to the noise power density $N_o$, as a function of the max{b} in 2 and wherein max{b} is the maximum value of the number of information bits per symbol b. Since the communications efficiency $\eta$=b/($T_s$B) in bits/sec/Hz it follows that maximum values of b and $\eta$ are equal. The derivation of the equation for $E_b/N_o$ uses the definition $E_b/N_o$=(S/N)/b in addition to 1 and 2. Reliable communications in the statement of the Shannon coding theorem 3 means an arbitrarily low bit error rate BER.

SUMMARY OF THE INVENTION

This invention introduces a maximum likelihood ML demodulation architecture and implementation to provide a computationally efficient demodulation of quadrature layered modulation QLM with data symbol rates that can be multiples of the Nyquist rate and communications data rates that can be multiples of the Shannon bound. QLM is a layered topology for transmitting higher data rates than possible with each layer of communications and is implemented by transmitting each layer with a differentiating parameter which enables separation and decoding of each layer. QLM is used to derive a bound on communications capacity and the QLM performance validates the bound by providing a modulation which becomes close to this bound with error correcting codes such as turbo codes. Trellis demodulation algorithms provide the best demodulation performance for arbitrary number of data symbols at the cost of computational complexity which limit their filings. The ML demodulation architecture and implementation disclosed in this invention provides comparable performance to the trellis algorithms without their computational complexity. Several representative ML architectures and implementations are disclosed with supporting Monte Carlo Matlab simulations of their implementation bit-error-rate BER performance.

BRIEF DESCRIPTION OF THE SEVERAL VIEWS OF THE DRAWINGS

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 3 calculates the QLM impact on the required power of a satellite-ground communications link to increase the data rate.

FIG. 4 presents the equations which define the new communications capacity bound.

FIG. 16 defines a 13×13 correlation matrix H for a QLM ML 4-filter group of filters.

F(G. 25 describes the filter and subbands for the WiFi QLM ML mode.

Figure 26:
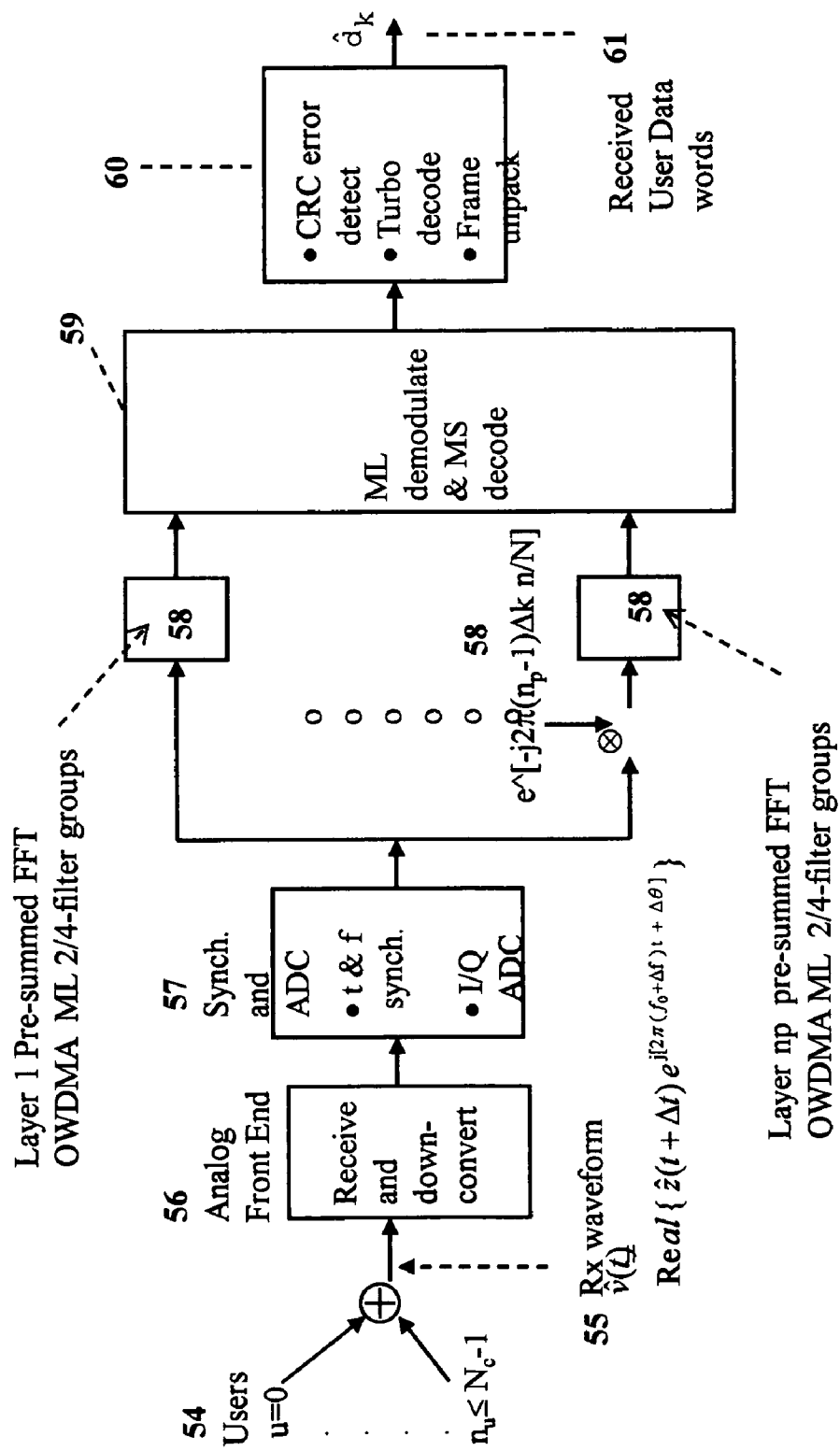

FIG. 26 is a representative receiver implementation block diagram for the OFDMA QLM QLM ML mode.

Figure 27:
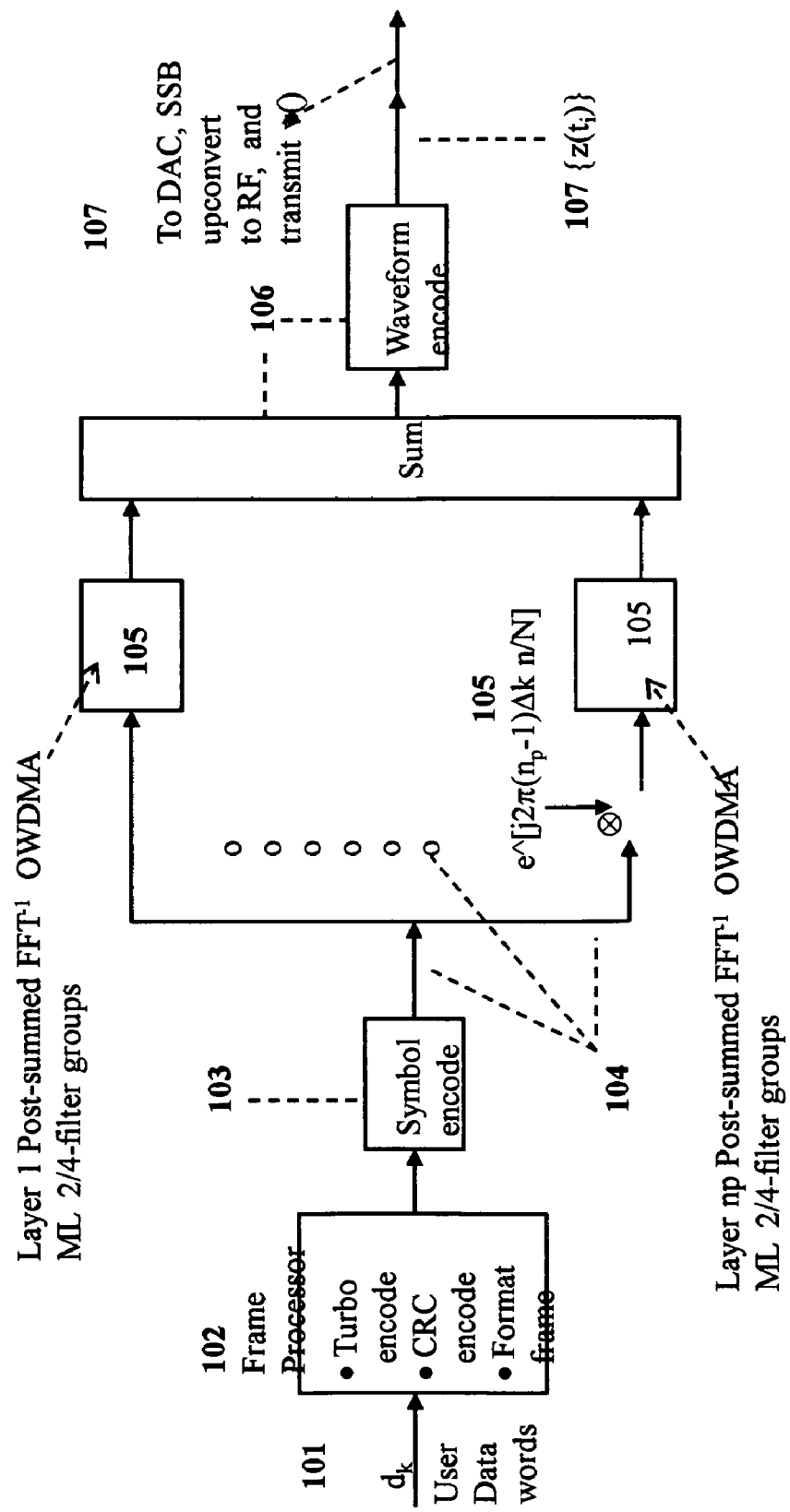

FIG. 27 is a representative transmitter implementation block diagram for the CDMA QLM ML mode.

FIG. 28 defines the complex Walsh and generalized complex Walsh orthogonal codes.

Figure 29:
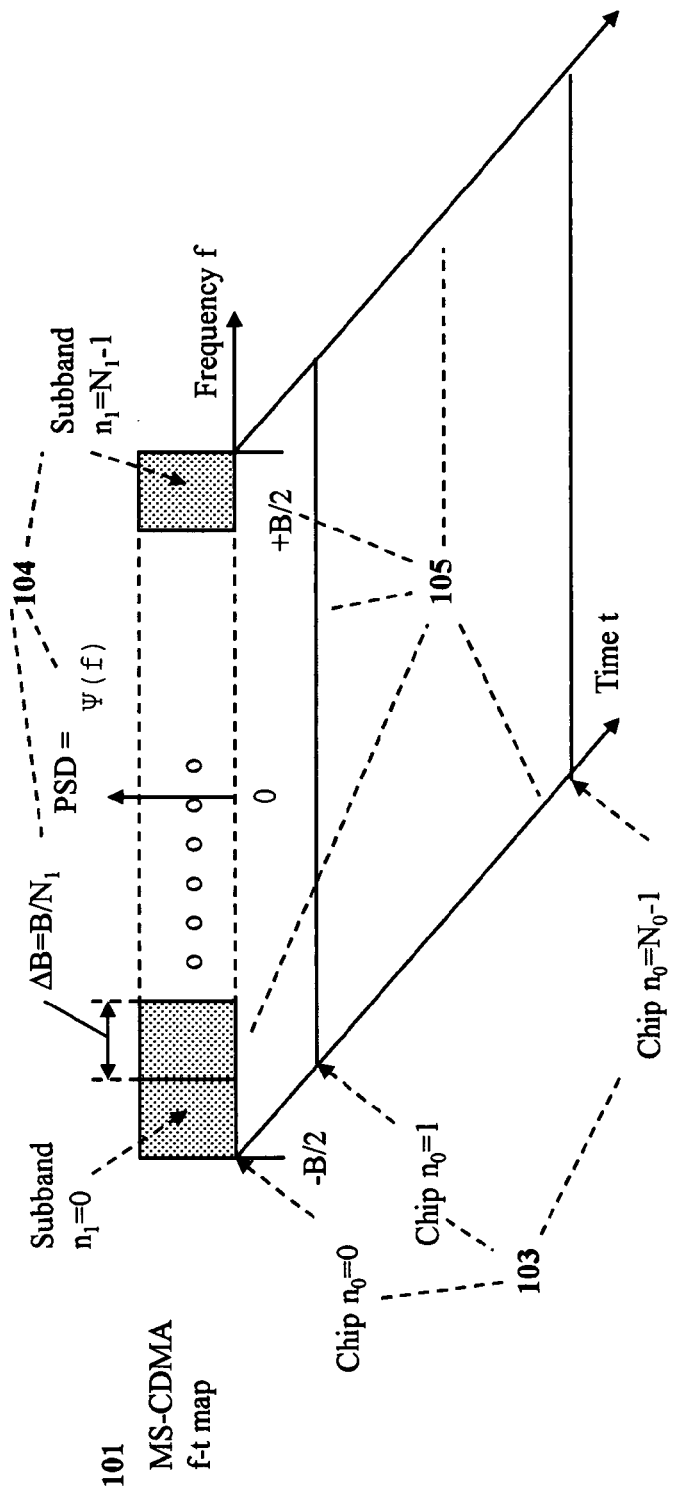

FIG. 29 describes the Multiple-Scale CDMA MS-CDMA coding for the QLM ML Mode Layer 1.

FIG. 30 describes the OWDMA partitioning of the CDMA band for the QLM ML Mode Layer 1

Figure 31:
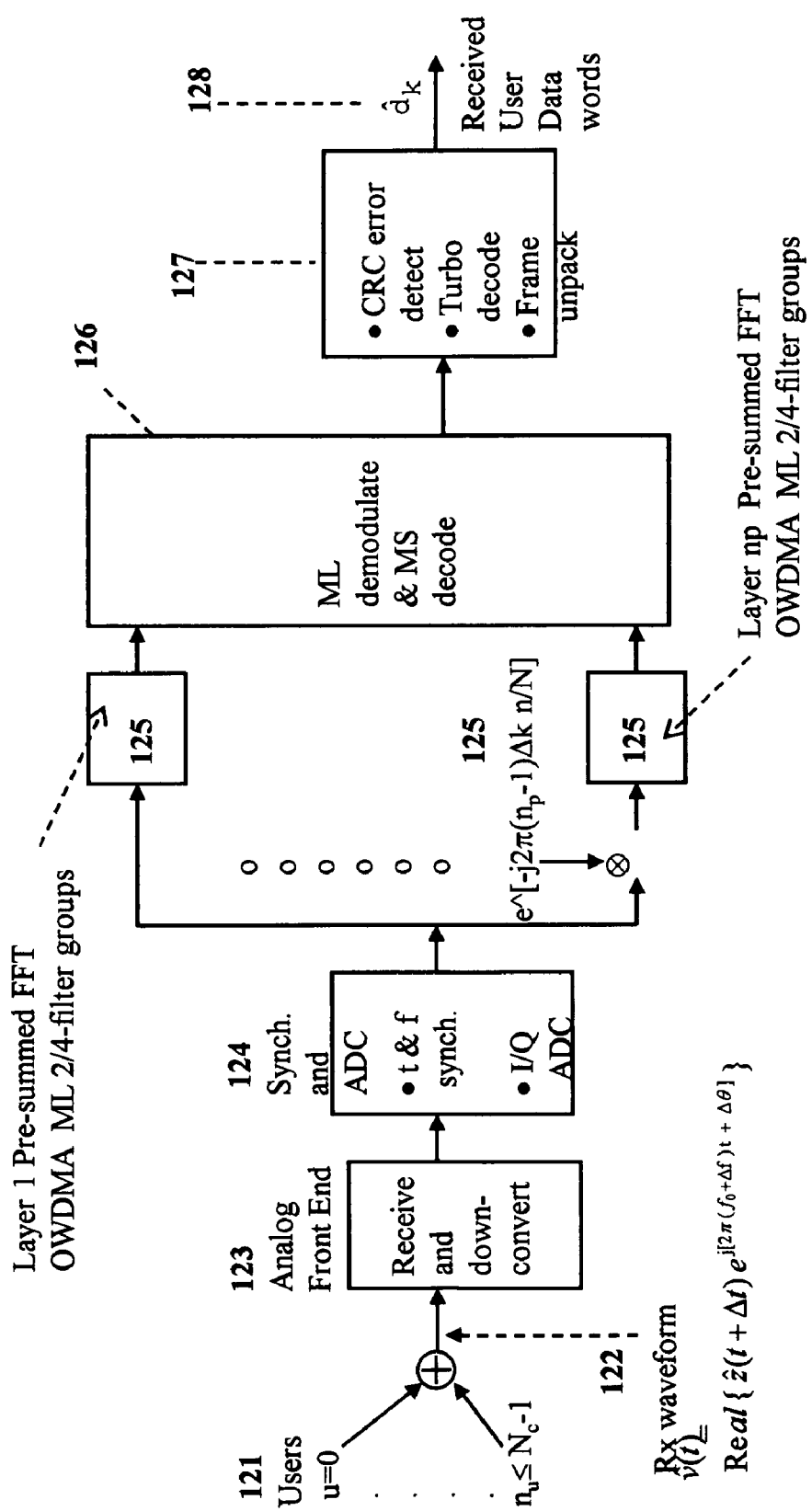

FIG. 31 is a representative receiver implementation block diagram for the CDMA QLM ML Mode.

FIG. 32 describes the single channel QLM ML mode for an ADSL filing example.

Figure 33:
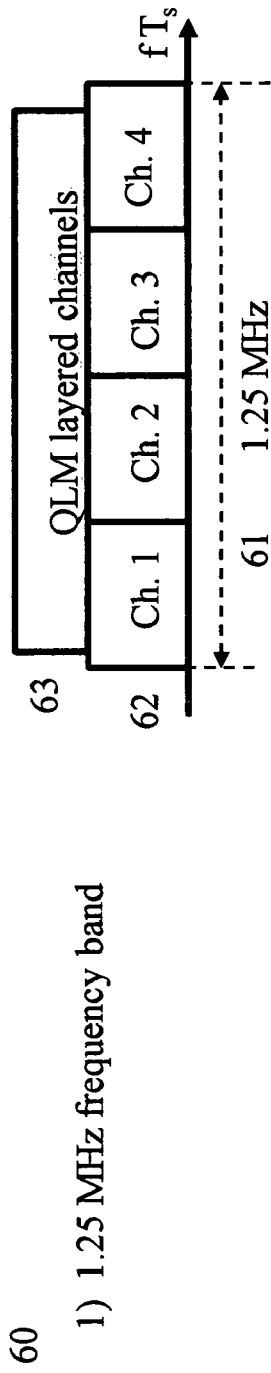

FIG. 33 describes the CDMA and WiFi QLM ML modes to support Blue-ray HD data rates.

DETAILED DESCRIPTION OF THE INVENTION

Matlab bit-error-rate BER implementation simulations demonstrate that communications channels can be layered with time/frequency offsets or other differentiating parameter(s) and can be demodulated with trellis and maximum likelihood ML algorithms to recover the information in each layer. Each communications layer obeys Shannon's laws. QLM (quadrature layered modulation) implements this layering with the required architecture, modulation, synchronization, time and frequency and other differentiating parameters, scaling of $E_b/N_o$ and S/N, and trellis and ML demodulation algorithms.

Figure 1:
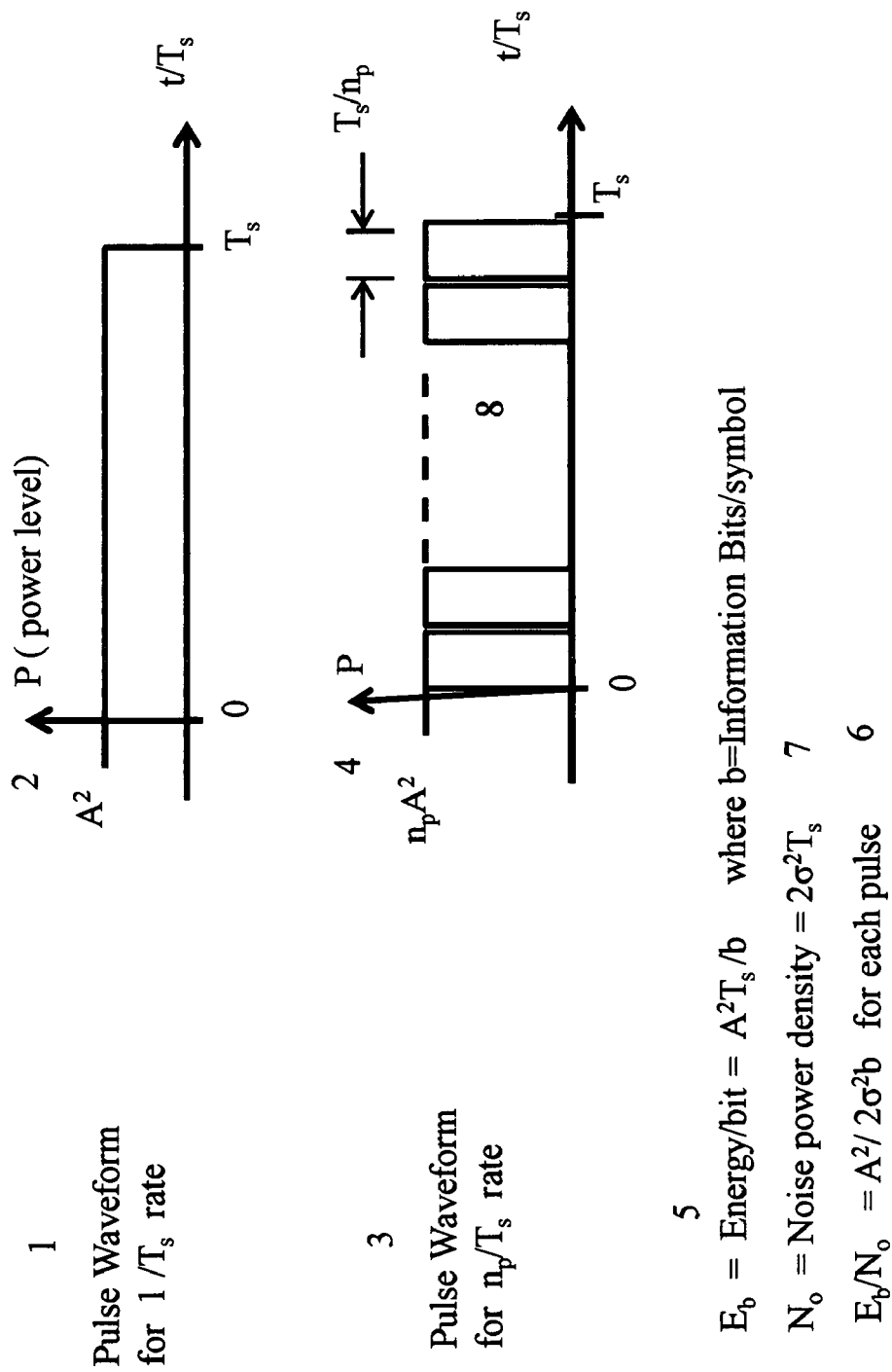
FIG. 1 describes how the data rate for a pulse waveform is increased using prior art.

FIG. 1 introduces QLM by considering an ideal pulse waveform in the time domain. In 1 the pulse waveform is transmitted at the data symbol rate equal to $1/T_s$=B where $T_s$ is the pulse length, B is the bandwidth, the signal power level 2 is $P=A^2$ where "A" is the signal amplitude, and the pulse modulation is phase shift keying PSK with "b" information bits per data symbol. To increase the data symbol rate to $n_p/T_s$ and the data rate to $n_p b/T_s$, the pulse waveform is shortened 3 to $T_s/n_p$ which increases the bandwidth to $n_p B$ and requires the transmitted power to be increased 4 to $P=n_p A^2$ in order to keep the same pulse energy per bit 5 $E_b=A^2 T_s/b$. The corresponding energy-per-bit to noise power ratio 6 is $E_b/N_o=A^2/2\sigma^2 b$ where 7 $N_o=2\sigma^2 T_s$ is the noise power density and "$2\sigma^2$" is the "root mean square" level of communication noise.

Figure 2:
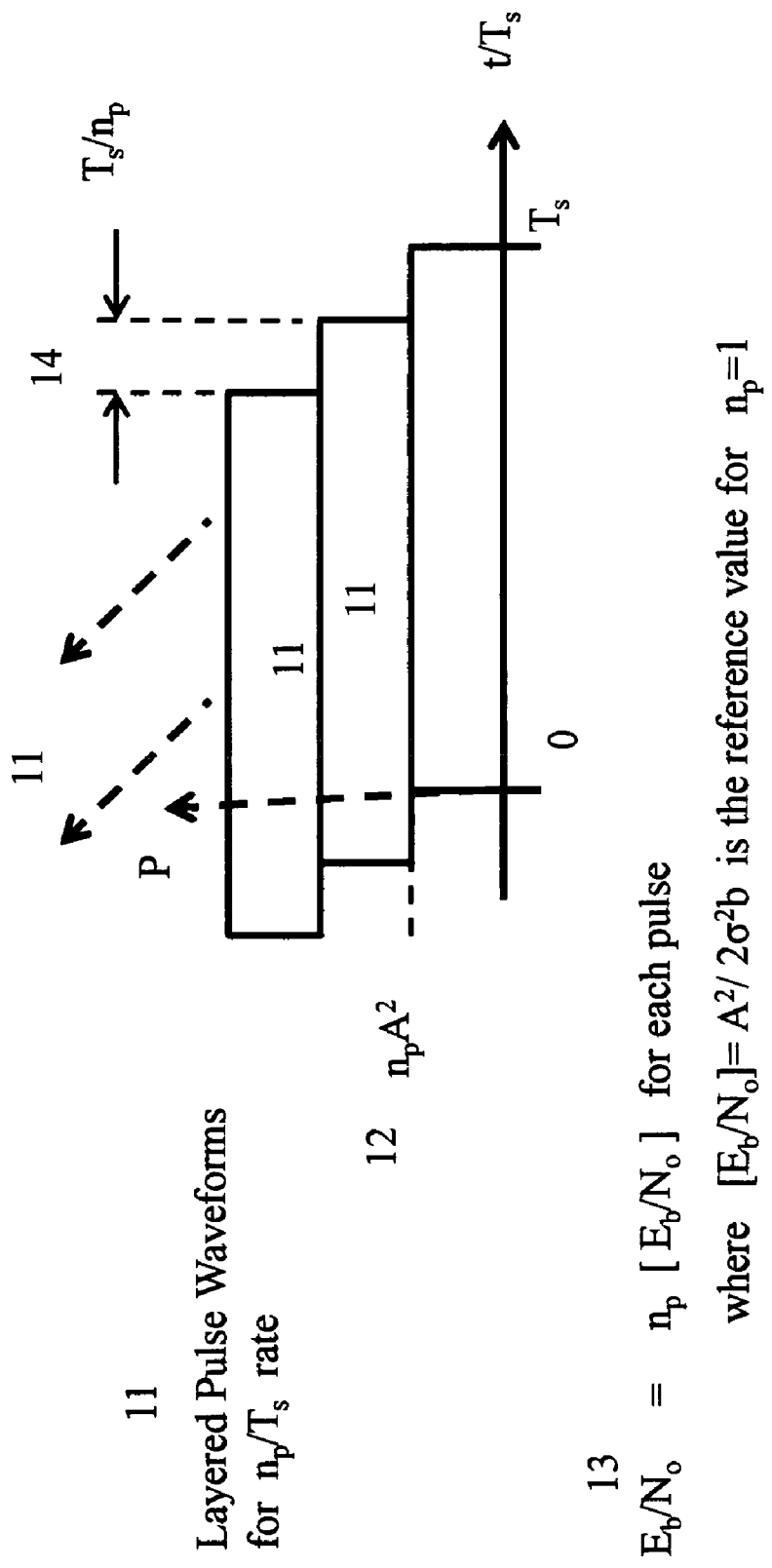
FIG. 2 describes how QLM layers the pulse waveform to increase the data rate.

FIG. 2 implements this increase in the data symbol rate using a QLM communications system without changing the bandwidth of the pulse waveform by extending the pulses 8 in FIG. 2 over the original pulse length $T_s$ and layering these extended data symbol waveforms on top of each other 11 while occupying the same bandwidth $B=1/T_s$. The pulse waveforms in each layer 13 have $E_b/N_o$ values equal to $n_p$ times the original $E_b/N_o=A^2/2\sigma^2 b$ due to the stretching of each pulse over $T_s$ without changing the power level of the pulse. The layers are time synchronized for transmission at $\Delta T_s=T_s/n_p, 2\Delta T_s, \ldots, (n_p-1)\Delta T_s$ offsets 14 respectively for layers 2,3, . . . , $(n_p-1)$ relative to the $1^{st}$ layer at zero offset. This means the signal-to-noise power S/N over $B=1/T_s$ is equal to $n_p\char`^2$ times the original S/N due to the addition of the $n_p$ pulse power levels 12 over each $T_s$ interval and the scaling of $E_b/N_o$ by $n_p$. This scaling of $E_b/N_o$ in each of the layered communications channels is summarized in equation (2) along with the corresponding scaling of the S/N over $T_s$. We find $$E_b/N_o = n_p[E_b/N_o] \quad \text{for each layer or channel} \quad (2)$$
$$= n_p[A^2/2\sigma^2 b]$$

-continued $$S/N = \Sigma n_p[A^2/2\sigma^2] \text{ over } n_p \text{ layers or channels}$$
$$= n_p{}^{\wedge}2\ [S/N] \qquad (5)$$

which can be inverted to solve for the scaling required to generate values equal to the values for the communications channel when there is no layering. We find $$[E_b/N_o] = E_b/N_o/n_p \qquad (3)$$

$$[S/N] = S/N/n_p{}^{\wedge}2$$

wherein ["o"] is the value of "o" for the communications channel when there is no layering.

FIG. 2 describes the layering of the communications channels for QLM and equation (3) defines the QLM scaling of the $E_b/N_o$ and S/N. QLM is a layered topology for transmitting higher data rates than possible with each layer of communications and is implemented by transmitting each layer with a differentiating parameter which enables separation and decoding of each layer. Each layer or channel has a unique differentiating parameter such as time offset as in FIG. 2 and/or frequency offset. Each layer or channel obeys Shannon's laws when using QLM scaling in equation (3).

QLM provides a means to increase the average symbol rate from the Nyquist rate $1/T_s = B$ assumed in the Shannon bound in equations (1) to the value $n_p/T_s = n_p B = n_p \times (\text{Nyquist Rate})$ with $n_p$ layers of the communications or equivalently with the addition of $(n_p - 1)$ parallel communications channels with differing characteristics which make them separable and recoverable in the receiver with implementation of a trellis type demodulation algorithm or a maximum likelihood ML demodulation algorithm in terms of capabilities and performance where "equivalent" includes the plurality of all possible mathematical techniques to provide alternative solutions compared to the broad class of trellis and ML algorithms. Note that "x" is the multiplication symbol for "times". In this patent disclosure the term "separable" is intended to mean there is a discriminating parameter or equivalently a differentiating parameter which allows the $n_p$ layers or equivalently channels to be uniquely recoverable.

FIG. 3 illustrates the impact of QLM on a satellite communications link with a ground terminal by calculating the increase Δ[o] in the communications link power {[EIRP $G_R/4\pi R^2$ kT (Loss)] that is required Δ[o]=6.12 dB to increase bit rate $R_b$ to $2 \times R_b \cdot 4 \times R_b$. Satellite-ground link parameters EIRP is the effective radiated microwave power, $G_R$ is the receive antenna gain, R is the transmission range, kT is the noise power density of the receive front end, and (Loss) is the loss in the transmission, receive, and demodulation signal processing.

The equations for the non-optimized channel capacity in Bps and information bits b per symbol interval are the Shannon's bounds in 1, 2 in equation (1) with the maximum "max" removed, with the [S/N] scaling in equations (3), and with the multiplication by "$n_p$" to account for the $n_p$ layers. We find $$C = n_p B \log_2[1+(S/N)/n_p{}^{\wedge}2]$$

$$b = n_p \log_2[1+(S/N)/n_p{}^{\wedge}2] \qquad (4)$$

wherein it is understood that the "C", "b" are non-optimized values with respect to the selection of the "$n_p$".

New upper bounds on C,b,η and a new lower bound on $E_b/N_o$ are derived in equations (5) by using equation (4) and equation (1). We find New capacity bounds and coding theorem (5)

1 $C = \max\{n_p B \log_2[1+(S/N)/n_p{}^{\wedge}2]\}$

2 $\max\{b\} = \max\{n_p \log_2[1+(S/N)/n_p{}^{\wedge}2]\}$
$= \max\{n_p \log_2[1+(b\ E_b/N_o)/n_p{}^{\wedge}2]\}$
$= \max\{\eta\}$ 3 $\min\{E_b/N_o\} = \min\{[n_p{}^{\wedge}2/b][2^{\wedge}b]/n_p - 1]\}$ 4. New coding theorem For $R_b < C$ there exists codes which support reliable communications For $R_b > C$ there are no codes which support reliable communications 5. New symbol rate $n_p/T_s$ $\max\{n_p/T_s\} = n_p B$ for $n_p$ layers of communications
$= n_p x$ (Nyquist rate for 1 channel)

wherein the maximum values of "C", "max(b)", "max{η}" of "C", "b", "η" are the respective maximums of the expressions in equation (4) with respect to $n_p$, the units of "C", "b", "η" are "Bps", "information bits/symbol interval", "Bps/Hz" which means "b" is expressed in units "Bps/Hz" as well as in units "information bits/symbol interval", and the "min{$E_b/N_o$}" is the minimum of "$E_b/N_o$" with respect to $n_p$ similar to the derivation in 2 in equations (1).

The new coding theorem in 4 in equations (5) states that C is the upper bound on the information data rate $R_b$ in bits/second for which error correcting codes exist to provide reliable communications with an arbitrarily low bit error rate BER wherein C is defined in 1 in equations (5) and upgrades the Shannon coding theorem 3 in equations (1) using new capacity bound C in 1 in equations (5) and introduces the new data symbol rate 5 whose maximum value max{$n_p/T_s$} is $n_p$ times the Nyquist rate for a single channel.

FIG. 4 restates the new communications bound in a format suitable for implementations. Listed are the new Nyquist rate 25, new bounds on C,b in 26, and the assumed bandwidth-time product in 27 with the note that the excess bandwidth α is zero α=0 for a QLM Wavelet waveform from U.S. Pat. No. 7,376,688 and filing Ser. No. 12/152,318.

Figure 5:
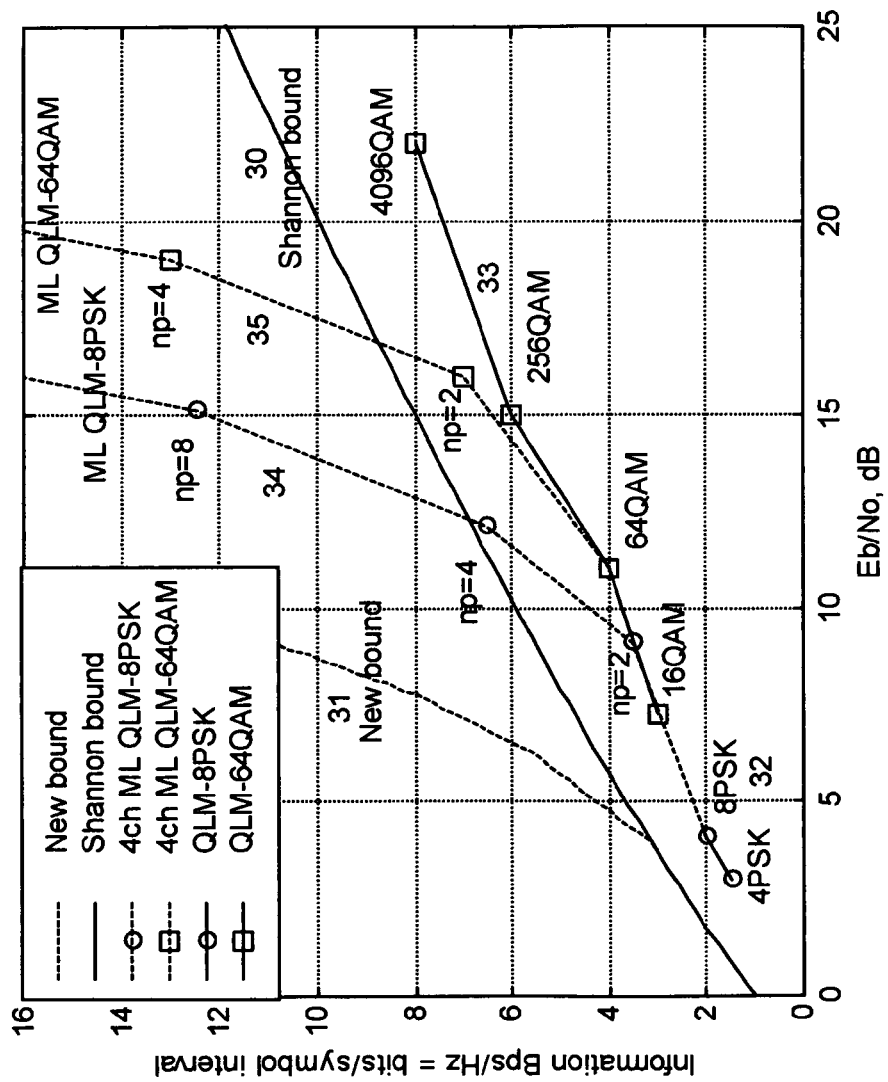
FIG. 5 calculates information bits b per symbol interval equivalently expressed as Bps/Hz versus $E_b/N_o$ for the new bound, Shannon bound, and for PSK, QAM at BER=1e−6 with turbo coding.

FIG. 5,6 calculate the $E_b/N_o$, S/N performance of the Shannon bound 30, the new bound 31, the quadrature amplitude QAM and phase shift keying PSK turbo coded performance, and the QLM performance examples for QLM-8PSK and QLM-64QAM. The new bound is from equations (5) and the Shannon bound from equations (1) wherein the units for b are Bps/Hz=bits/(symbol interval) consistent with the Shannon bound wherein "symbol interval" refers to the $T_s$ interval The turbo coded PSK 32 and turbo coded QAM 33 plot the number of information bits per symbol b versus measured $E_b/N_o$, S/N for 4PSK, 8PSK, 16QAM, 64QAM, 256QAM, 4096QAM. The 4PSK, 8PSK are 4-phase, 8-phase shift keying modulations which respectively encode 2, 3 bits per symbol and 16QAM, 64QAM, 256QAM, 1024QAM are 16, 64, 256, 4096 state QAM modulations which respectively encode 4, 6, 8, 12 bits. For no coding the information bits per symbol b is equal to the modulation bits per symbol $b_s$ so that $b=b_s=2, 3, 4, 6, 8, 12$ bits per symbol respectively for 4PSK, 8PSK, 16QAM, 64QAM, 256QAM, 4096QAM. Turbo coding performance assumes a modest 4 state recursive systematic convolutional code RSC, 1024 bit interleaver, and 4 turbo decoding iterations. The assumed coding rates R=¾, ⅔, ¾, ⅔, ¾, ⅔ reduce the information bits per symbol to the respective values b=1.5, 2, 3, 4, 6, 8 bits. Performance data is from U.S. Pat. No. 7,391,819 and filings Ser. Nos. 12/069,418, 12/151,986

QLM demodulation received signal processing synchronizes and removes the received waveform to detect the correlated data symbols. These correlated data signals are processed with a trellis algorithm to recover estimates of the encoded symbol data, or processed by a ML algorithm to recover estimates of the data symbols, or processed by another demodulation algorithm to recover the transmitted symbols and data. The ability to process the received correlated data symbols depends on the correlation (auto-correlation) function being well-behaved. A correlation function is a discriminating parameter or equivalently a differentiating parameter which enables the QLM layers to be demodulated to recover the transmitted data symbols and data. Plots of representative correlation functions in time and frequency offsets are given in FIG. 7, 8, 13, 14.

Figure 7:
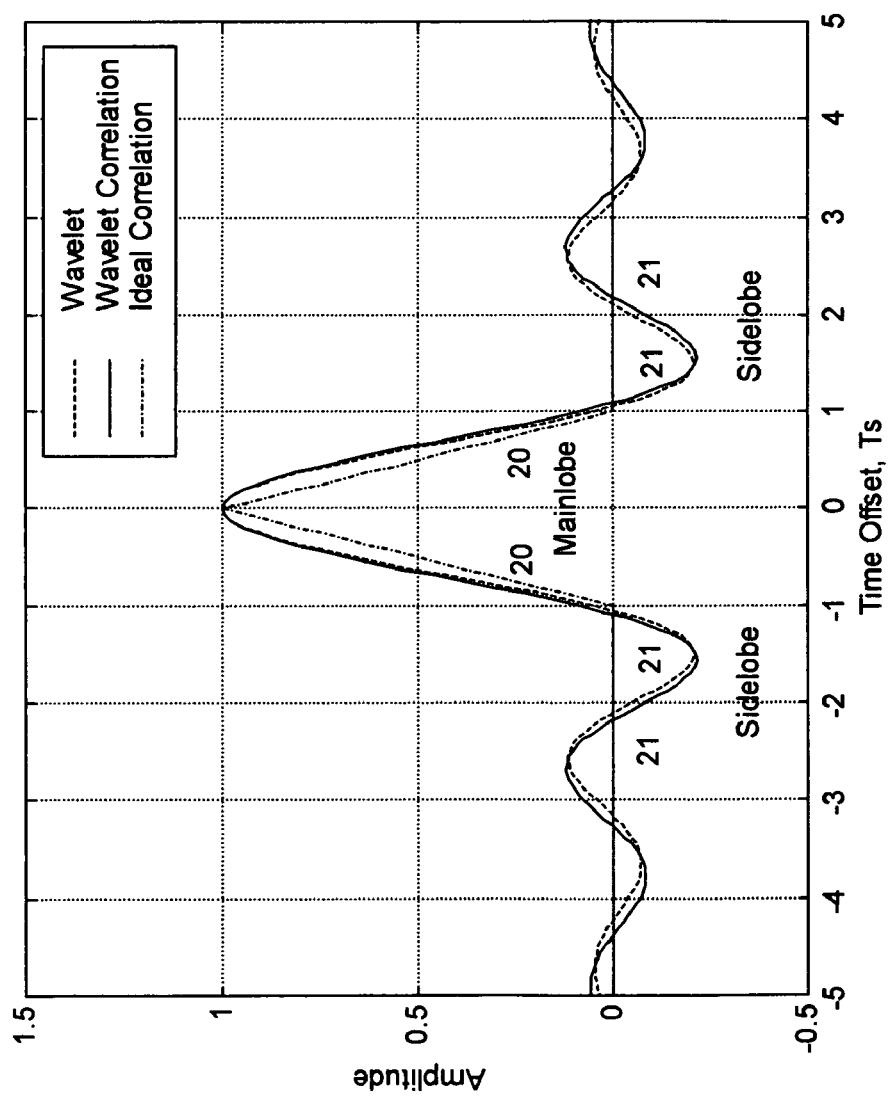
FIG. 7 plots a OWDMA Wavelet waveform in time, the Wavelet correlation function in time, and the ideal correlation function in time.

FIG. 7 presents a QLM Wavelet waveform for OWDMA in time, the correlation function, and an ideal correlation function in time for a pulse waveform in FIG. 2. The correlation function closely approximates the waveform and the ideal correlation with a triangular mainlobe, and has a mainlobe 20 extending over a $2T_s$ second interval with low sidelobes 21.

Figure 8:
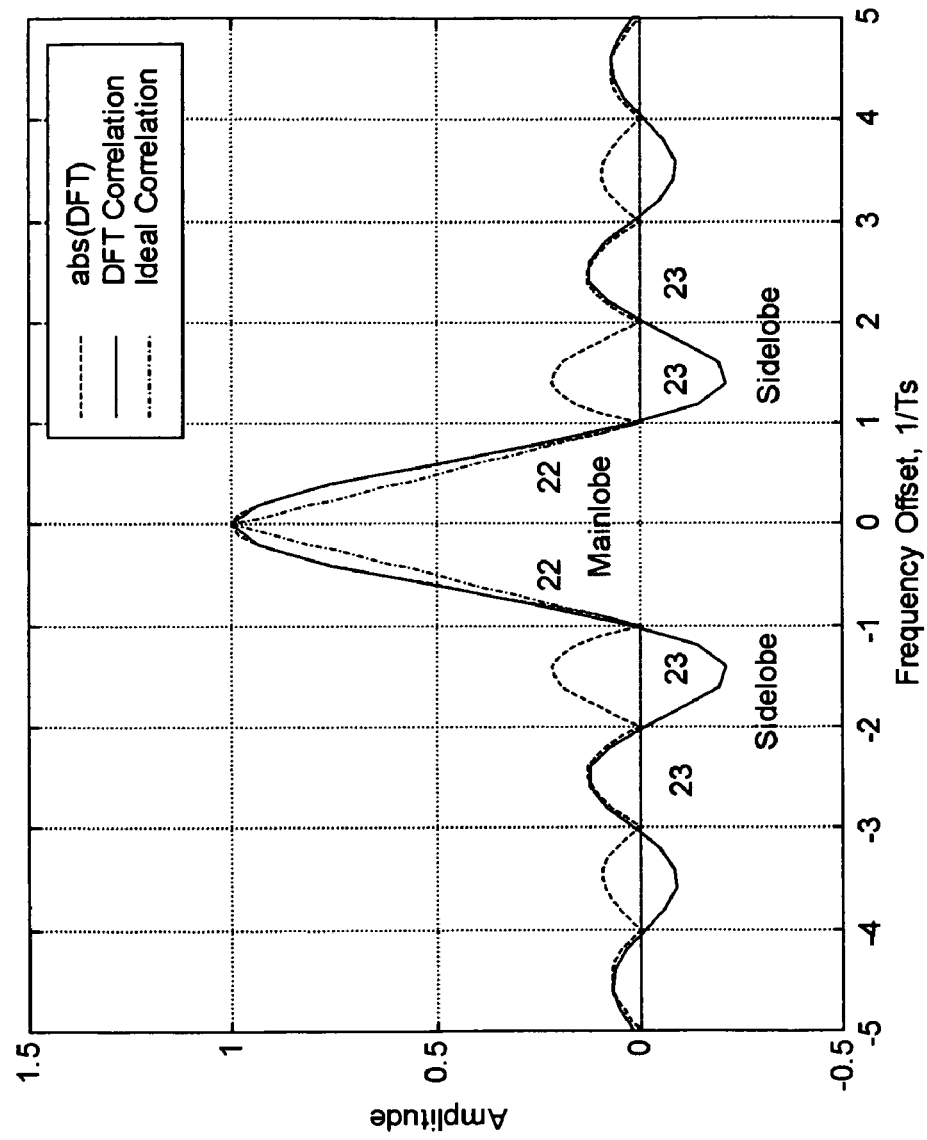
FIG. 8 plots a OFDMA discrete Fourier transform DFT waveform in frequency, the DFT correlation function in frequency, and the ideal correlation function in frequency.

FIG. 8 presents a N=64 point discrete Fourier transform DFT for OFDMA in frequency, the correlation function, and an ideal correlation function in frequency for a pulse waveform in frequency. The correlation function closely approximates the waveform and the ideal correlation with a triangular mainlobe, and has a mainlobe 22 extending over $2/T_s=2B$ Hz interval with low sidelobes 23 wherein the symbol rate $1/T_s$ is at the Nyquist rate and equal to the bandwidth B for each channel.

Demodulation algorithms are grouped into trellis symbol algorithms, trellis bit algorithms, maximum likelihood ML symbol algorithms, and other algorithms. In order of decreasing complexity a listing of these algorithms is given in equation (6) wherein it is noted other possible algorithms are not listed.

1. Trellis data symbol    (6)

2. Trellis data symbol with pruning and iteration

3. Trellis data bit

4. Trellis data bit with pruning and iteration

5. Maximum likelihood (ML)

Trellis symbol algorithms are trellis algorithms over the correlated data symbol fields and use ML, maximum a-posteriori MAP, or other decisioning metrics. Trellis bit algorithms are trellis algorithms over the data symbol correlated bit fields. MAP decisioning metrics Pruning and iteration are methods to reduce the number of active states and to include the effects of sidelobes with no increase in the number of active trellis states. MAP decisioning metrics have been introduced in filing Ser. No. 10/772,597 for trellis and convolutional decoding using trellis algorithms. Trellis bit algorithms solve for the consecutive bits of the data symbol starting with the lowest order and is less complex than trellis symbol algorithms since only one or possibly a few of the bits are solved in each pass over the set of received data symbols. ML algorithms solve the QLM system equations for the correlated signals to find estimates of the data symbols in each of the QLM layers and therefore are the least complex of the demodulation algorithms. On the other hand, ML is limited to a relatively few data symbols.

This classification of demodulation algorithms is introduced to illustrate representative methods for constructing demodulation algorithms and is not a limitation on the scope of this invention which encompasses all possible demodulation algorithms for QLM.

Figure 6:
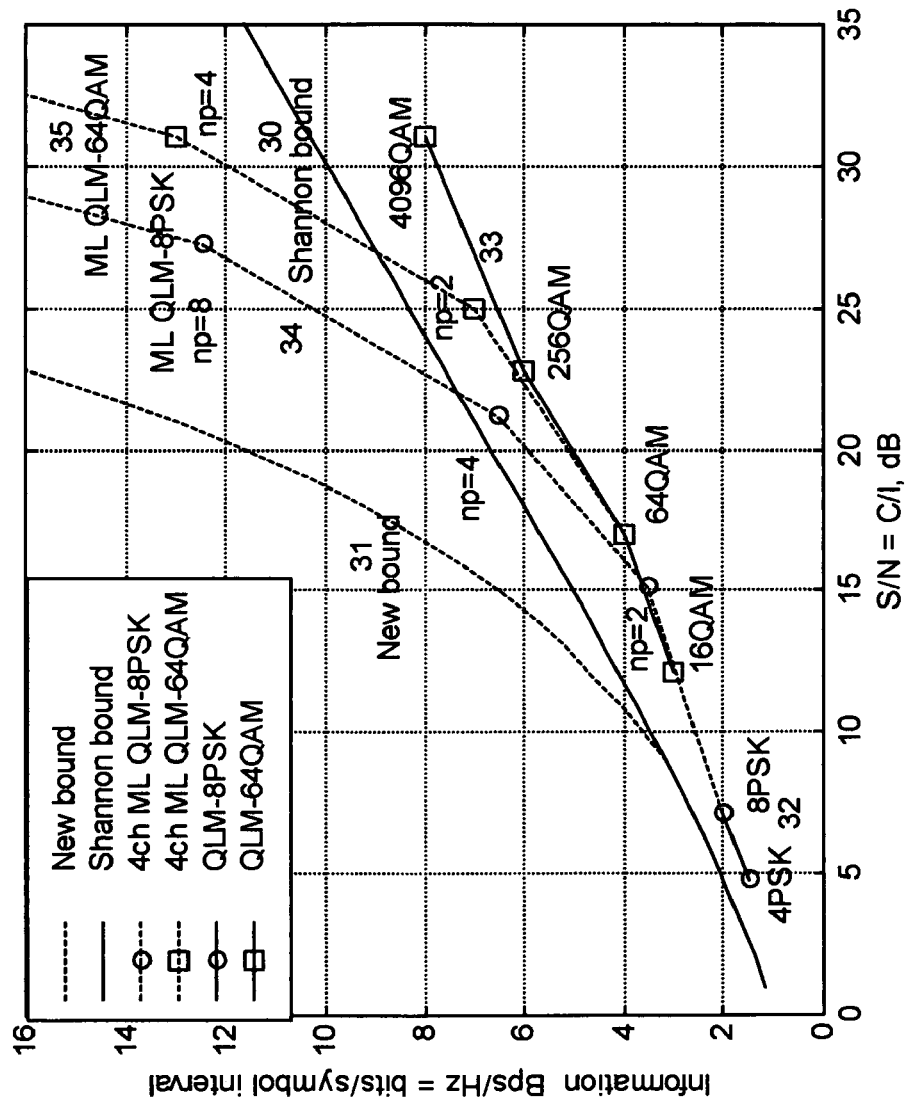
FIG. 6 calculates b versus S/N=C/I for the new bound, Shannon bound, and for PSK, QAM at BER=1e−6 with turbo coding.

FIG. 9 is an implementation block diagram of a representative trellis data symbol demodulation algorithm using a ML decisioning metric or a MAP decisioning metric disclosed in U.S. Pat. No. 7,391,819 or another decisioning metric. Basic elements of the algorithm are the trellis parameters 170, trellis algorithm 171 structured by the parameter set in 170, and followed by trellis error correction decoding 172. The parameter set 170 is applicable to the ideal pulse modulation defined in FIG. 8 with time as the differentiating parameter as well as to the pulse waveforms in FIG. 6,7 and to other filings with other differentiating parameters. The correlation function for the pulse waveform defined in FIG. 2 has zero sidelobes which means only the mainlobe correlation has to be considered in the trellis algorithm. It is sufficient to use a one-sided correlation function since the correlation is symmetrical about the origin whereupon the correlation vector C whose elements are the mainlobe correlation coefficients is observed to be equal to $C=[c(0),c(1),c(2),c(3)]=[1,¾,½,⅕]$ for $n_p=4$ where the correlation coefficients are $c(0),c(1),c(2),c(3)$. Other trellis parameters are the number of data symbols n, number of parallel QLM channels $n_p$, number of data symbol states $n_s$, and the number of trellis states $n_t=n_s\hat{\ }(2n_p-1)=2\hat{\ }b_s(2n_p-1)$ wherein $n_s=2\hat{\ }b_s=4, 8, 16, 64, 256$ for 4PSK, 8PSK, 16QAM, 64QAM, 256QAM.

Figure 9A:
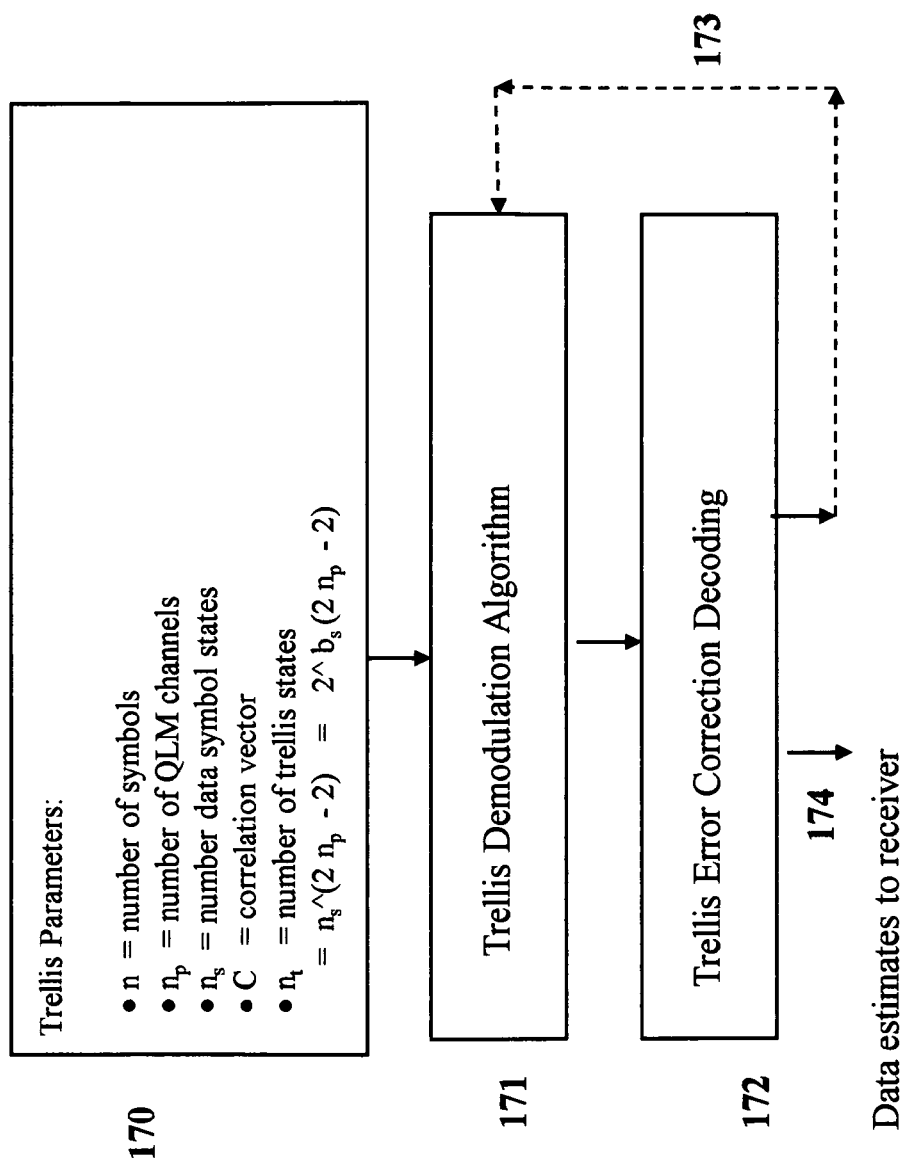
FIG. 9A is a block diagram of a trellis symbol demodulation algorithm.
Figure 9B:
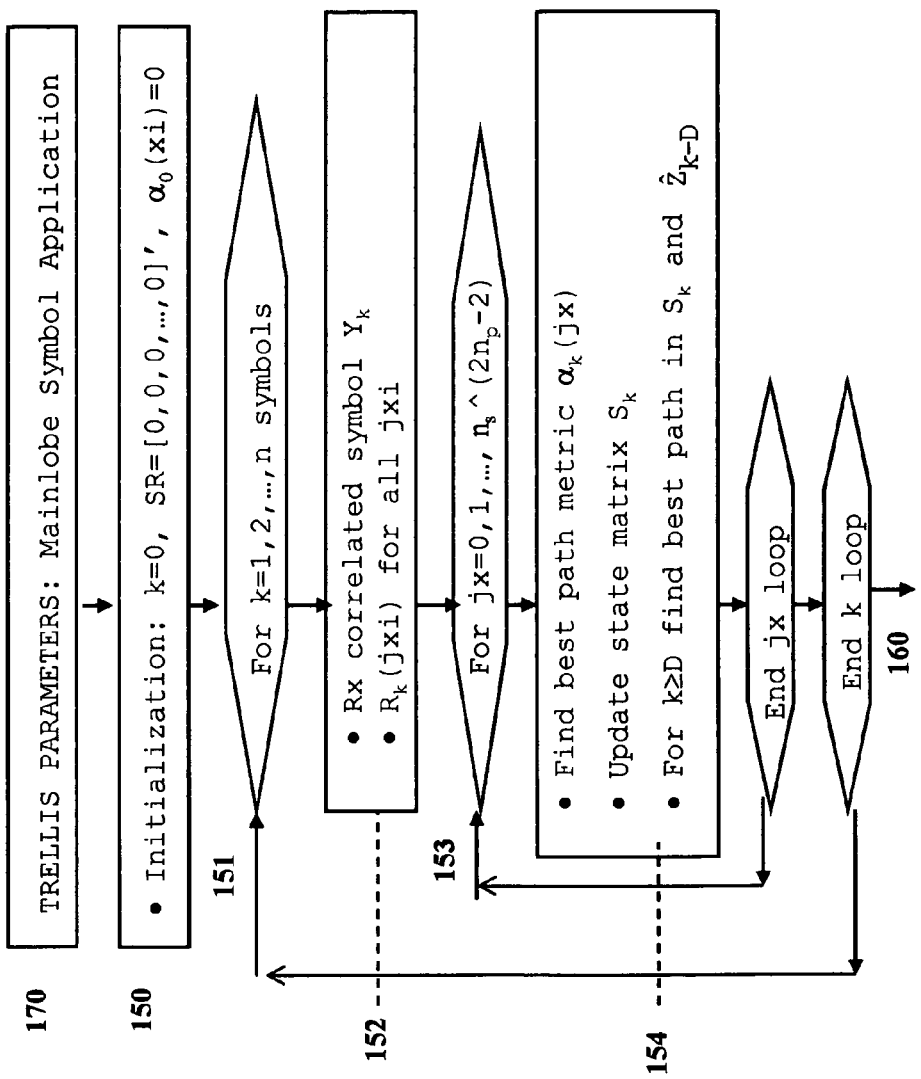
FIG. 9B is the flow diagram of the trellis symbol demodulation algorithm.

FIG. 9B uses the trellis parameters 170 in the initialization 150 prior to the start k=0 with an empty shift register SR which normally contains the $2n_p-1$ Rx correlated data symbols for the mainlobe plus the correlated symbols for the sidelobes, for each of the possible trellis paths. At k=0 the path metric $\alpha_0(xi)$ is set equal to a negative or zero initialization constant for all of the nodes $xi=0, 1, 2, \ldots, (n_s\hat{\ }(2n_p-2)-1)$ of the trellis diagram where $\alpha_0(xi)$ is the logarithm of the state $S_0$ path metric at k=0 for node xi, $n_s$ is the number of states of the data symbol modulation, the Rx symbols are indexed over k with k=0 indicating the initial value prior to the Rx symbol k=1, nodes of the trellis diagram are the states of the SR, and state $S_k$ refers to the trellis diagram paths and metrics at symbol k in the trellis algorithm.

Loop 151 processes the Rx symbols $k=1, 2, \ldots, n$ where the index k also refers to the corresponding algorithm steps and the states of the trellis algorithm. In 152 the Rx signals are pulse detected to remove the carrier frequency and waveform to recover the normalized correlated data symbol $Y_k$. For each Rx symbol $Y_k$ the state transition decisioning metrics $R_k(jxi)$ are calculated by the transition metric equations $\{R_k(jxi)=-|Y_k-\hat{X}_k(jxi)|\hat{\ }2\}$ for a ML metric, $\{R_k(jxi)=|\hat{X}_k|\hat{\ }2-2\text{Real}(Y_k \hat{X}_k(jxi))*\}$ for a MAP metric wherein (o)* is the complex conjugate of (o), for $\{R_k(jxi)=\text{Metric}(Y_k,\hat{X}_k)\}$ another metric, for all possible transition paths $\{jxi\}$ from the previous state $S_{k-1}(xi)$ at node xi to the new state $S_k(jx)$ at node jx in the trellis diagram snd where $\hat{X}_k(jxi)$ is the hypothesized normalized detected correlated symbol k for the path jxi. For a mainlobe correlation function the $\hat{X}_k(jxi)$ is defined by the equation $\hat{X}_k(jxi)=c(n_p-1)[sr(1)+sr(2n_p-1)]+\ldots+c(1)[sr(n_p-$ 1)+sr($n_p$+1)]+c(0)[sr($n_p$)] which calculates $\hat{X}_k$(jxi) as the correlated weighted sum of the elements of the shift register SR=[sr(1),sr(2), . . . , sr(2$n_p$-1)]' with $\hat{Z}_k$=sr($n_p$), $\hat{Z}_{k-1}$=sr($n_p$-1), $\hat{Z}_{k+1}$=sr($n_p$+1), . . . where c(0)=1, the normalized data symbol estimates {$\hat{Z}_k$} correspond to the transition index jxi, and the state k estimated symbol $\hat{Z}_k$ is the SR center element sr($n_p$) with correlation coefficient c(0)=1. Symbols move from left to right starting with "j" with each new received symbol or step in the trellis recursion algorithm, and ending with "i". With this convention "j" is indexed over the states of sr(1), "x" is indexed over the current states of sr(2), . . . , sr(2$n_p$-2), and "i" is indexed over the states of sr(2$n_p$-1). Index over the paths of the trellis diagram is defined by the equation jxi=sr(1)+$n_s$ sr(2)+$n_s^2$ sr(3)+ . . . +$n_s$^(2$n_p$-2) sr(2$n_p$-1)-1=0, 1, 2, . . . , $n_s$^(2$n_p$-1)-1 when the contents of the SR elements are the indices corresponding to the assumed data symbol state values.

Loop 153 calculates the best trellis transition paths from state $S_{k-1}$ to the new state $S_k$ for the new nodes jx=0, 1, 2, . . . , $n_s$^(2$n_p$-2)-1. In 154 the path metric $\alpha_k(S_k)$ is defined by the recursive logarithm equation $\alpha_k(S_k)=\alpha_{k-1}(S_{k-1})+R(S_{k-1}\to S_k)$ which can be rewritten as $\alpha_k$(jx)=$\alpha_{k-1}$(xi)+R(jxi) since the state $S_k$ corresponds to node jx, state $S_{k-1}$ corresponds to node xi and the state transition from $S_{k-1}$ to $S_k$ represented symbolically as $S_{k-1}\to S_k$ corresponds to the path jxi.

The best path metric $\alpha_k$(jx) for each new node jx is chosen by the decisioning equation $\alpha_k$(jx)=maximum{$\alpha_{k-1}$(xi)+$R_k$(jxi)} with respect to the admissible xi. For each jx, the corresponding xi yielding the highest value of the path metric $\alpha_k$(jx) is used to define the new symbol $\hat{Z}_k$ and path.

For k≧D the state metric $S_k$ is upgraded for this new path jxi by the update operation $S_k$(:,jx)=[$\hat{Z}_k$(jxi); $S_{k-1}$(1:D-1, xi)] using Matlab notation which replaces the column jx vector with the column xi vector after the elements of xi have been moved down by one symbol and the new symbol $\hat{Z}_k$ added to the top of the column vector which is the row 1 element. State $S_k$ is a D by ($n_\phi$^(2$n_p$-2) matrix with the column vectors equal to the trellis states over the past D symbols where "D" is the trellis decoding memory extending over several correlation lengths (2np-1) for the solution to be stabilized. In Matlab notation the $S_k$(:,jx) is the column vector jx of $S_k$ consisting of the new symbol $\hat{Z}_k$ and the previous D-1 symbols along the trellis path to node jx and the $S_{k-1}$(1:D,xi) is the Dx1 column vector of $S_{k-1}$ for the previous node xi.

For k≦D the state metric $S_k$ is upgraded for this new path jxi by the operation $S_k$(:,jx)=[$\hat{Z}_k$(jxi); $S_{k-1}$(:,xi)] which replaces the column jx vector with the column xi vector after the new symbol $\hat{Z}_k$ has been added to the top of the column which is the row 1 element to increase the path size by one. State $S_k$ is a k by ($n_\phi$^(2$n_p$-2) matrix with the column vectors equal to the trellis states over the past k symbols.

Metric values for each path in $S_k$ are stored for later use in soft decisioning turbo and convolutional decoding. Metrics of interest for each symbol k and for each jx are the values of {$\alpha_{k-1}$(xi)+R(jxi)} for all admissible xi states for the new path symbol $\hat{Z}_k$ for jx for k.

For symbols k≧D the estimated values $\hat{Z}_{k-D}$ of the Tx symbols are delayed by the path length D and read from the last row element of the column jx path vector of the state metric $S_k$ for symbol k, and the readout continues until k=n. This ends the jx loop 153 and the k loop 151.

Processing 162 continues with steps k=n+1, . . . , n+D-1 160,161 to recover the estimated values $\hat{Z}_{k-D}$ of the Tx symbols $Z_k$ which are read from the corresponding row elements D-1, D-2, . . . , 1 of the column jx path vector of the state metric $S_n$ for the last symbol k=n. This ends the jx loop 161.

Outputs 164 of the trellis algorithm used for trellis decoding are the estimates {$\hat{Z}_k$} of the transmitted symbols {$Z_k$} and the corresponding metric values for all admissible states for each new path symbol $\hat{Z}_k$ for all k. These symbol estimates and metric measurements are the soft decisioning data estimates handed over 165 to recover the Tx data or handed over for error correction decoding 166 with turbo or convolutional decoding. Another option is to combine the error correction decoding with the symbol recovery.

Figure 9C:
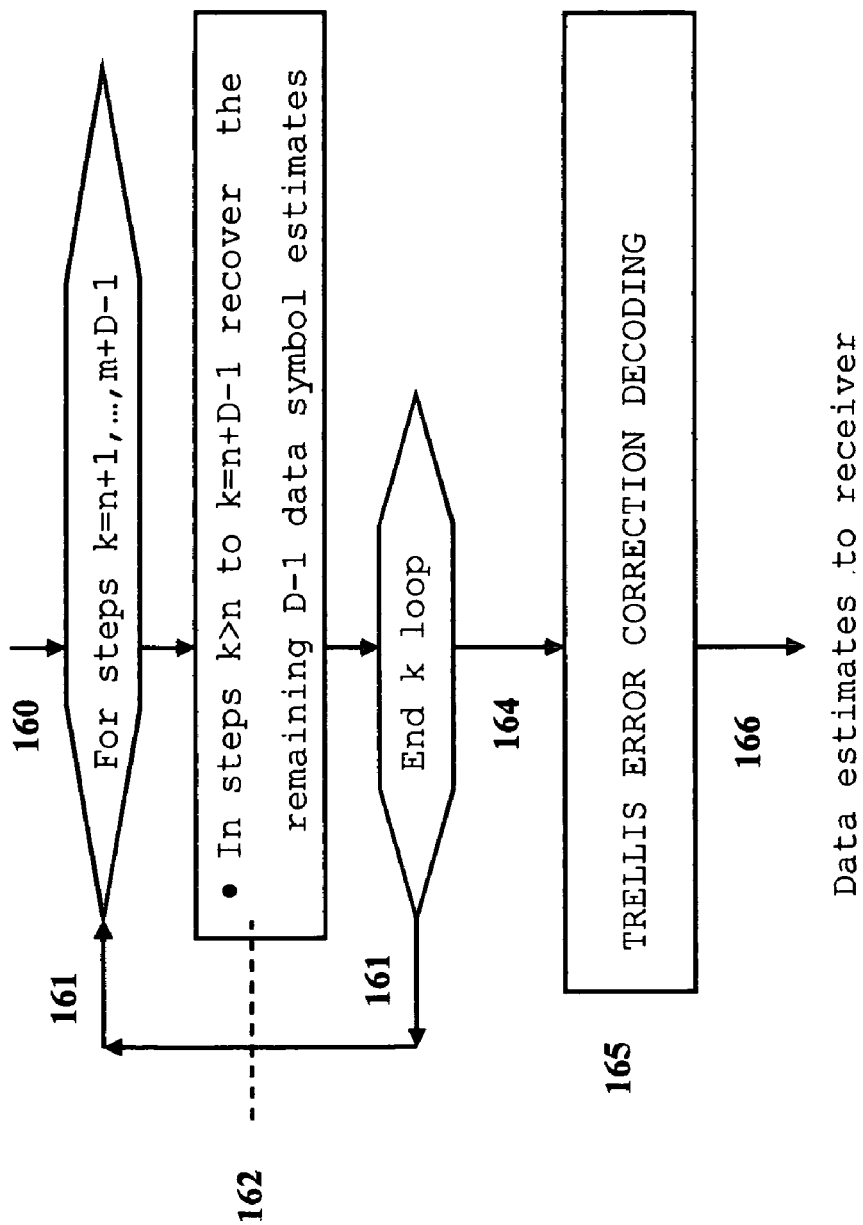
FIG. 9C is the continuation of the flow diagram of the trellis symbol demodulation algorithm.

The trellis algorithm for QLM example FIG. 9 using partial symbol $\Delta T_s$ integration presents another approach to a trellis algorithm for symbol recovery which offers a potential reduction in computational complexity compared to the algorithm for full symbol $T_s$ integration in the trellis algorithm in FIG. 9. The largest computational burden is the calculation of the metrics, paths, and states. For the trellis algorithm in FIG. 9B,9C. the number of calculations is determined by the number $n_s$^(2$n_p$-2) of nodes in the trellis algorithm. For the $\Delta T_s$ integration in the trellis algorithm the number of nodes reduces to a significantly lower number $n_s$^($n_p$-1). For this invention disclosure it is sufficient to demonstrate the trellis algorithm defined in FIG. 9.

Figure 10:
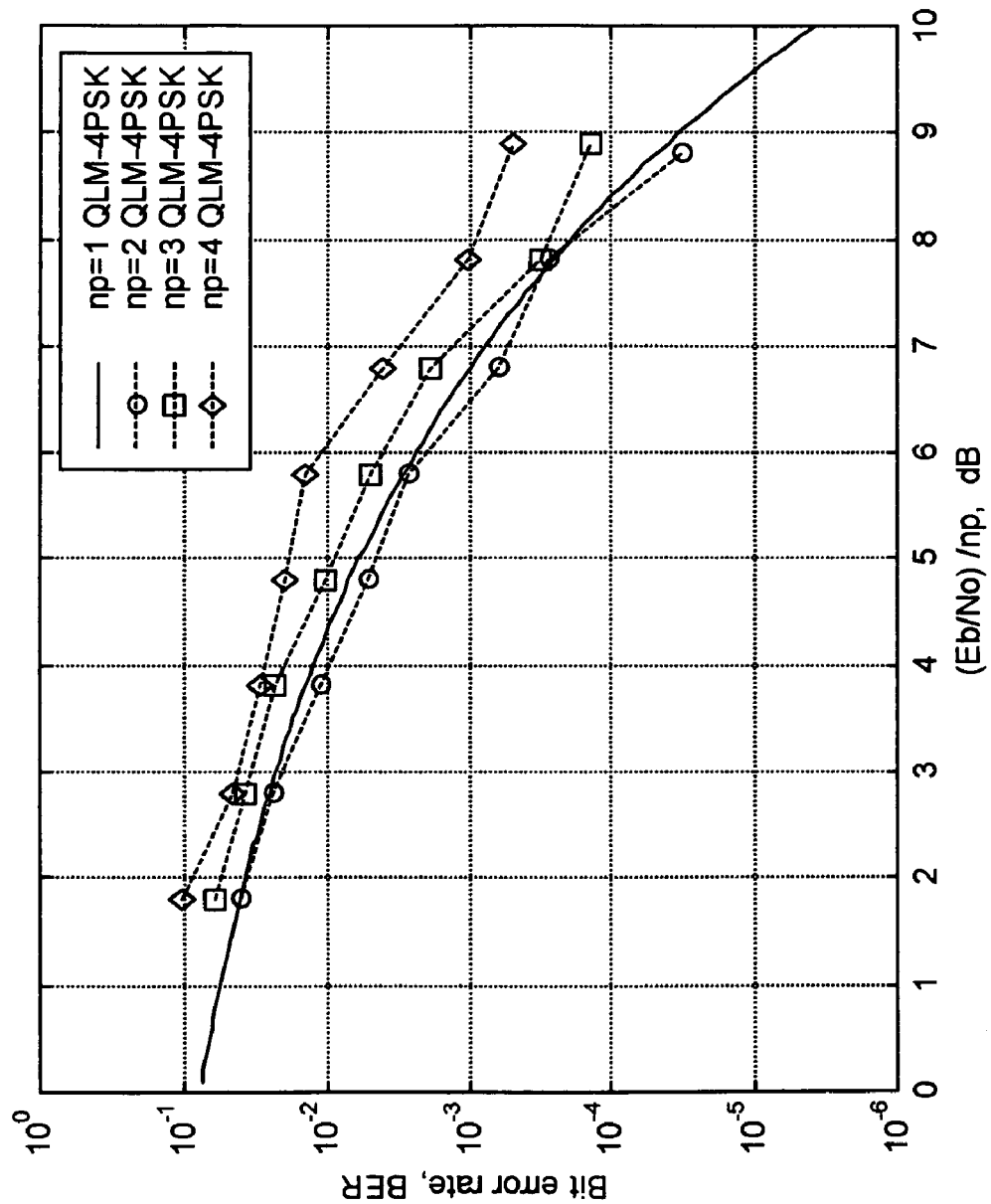
FIG. 10 plots the measured bit-error-rate BER performance for the uncoded 4-PSK QLM and $n_p$=1, 2, 3, 4 layered QLM pulse waveform in FIG. 2 using the trellis demodulation algorithm in FIG. 9.

FIG. 10 measures the trellis decoding performance for uncoded 4-PSK $n_p$=1 and for $n_p$=2, 3, 4 layers of QLM modulation implementing the decoding algorithm FIG. 9. Performance is plotted as bit error rate BER versus the normalized value ($E_b/N_o$)/$n_p$ of the $E_b/N_o$ for the new bound from equations 4, 5. Normalization means that for a given BER the ($E_b/N_o$)/$n_p$ has the same value for all $n_p$. For example, this means that BER=0.001 requires ($E_b/N_o$)/$n_p$=6.8 dB and for $n_p$=1, 2, 4 this requires $E_b/N_o$=6.8+0=6.8, 6.8+3=9.8, 6.8+6=12.8 dB respectively. Measured performance values for $n_p$=2, 3, 4 are from a direct error count Monte Carlo simulation of the trellis algorithm and are plotted in FIG. 10 as discrete measurement points.

An iterative trellis symbol algorithm is used to incorporate the effects of the sidelobes of the correlation function into the trellis state transition metric function $R_k$(jxi) in 152 in FIG. 9B in the non-iterative trellis symbol algorithm with a relatively small increase in computational complexity. In FIG. 9 the algorithm is initialized with the parameter set in 170 in FIG. 9A with the partitioning of the correlation vector C into the mainlobe vector $C_0$ plus the sidelobe vector $C_1$ and adding the specification of the stopping rule for the iterations. For a correlation vector C=[c(0),c(1), . . . , c($n_p$-1),c($n_p$), . . . , c($n_c$)] consisting of $n_c$ correlation coefficients the mainlobe vector is $C_0$=[c(0),c(1), . . . , c($n_p$-1),0,0, . . . , 0] and the sidelobe vector is $C_1$=[0,0, . . . , 0,c($n_p$), . . . , c($n_c$)] to partition C=$C_0$+$C_1$. The iterative algorithm starts by implementing the trellis algorithm 171 in FIG. 9A for the correlation mainlobe using the non-zero $C_0$ coefficients. Output data symbol estimates are used to calculate the a-priori estimated sidelobe contribution to $\hat{X}_k$(jxi) which is the hypothesized normalized detected correlated symbol k for the path jxi in the calculation of the metric $R_k$(jxi) in 152 in FIG. 9B. This enables the algorithm in FIG. 9 to calculate the data symbol estimates with the inclusion of the sidelobe contributions to $\hat{X}_k$(jxi). This procedure is repeated for the next iteration if required, and continues until convergence.

A method to reduce the number of trellis states is to use a sequential trellis bit algorithm. With this method the data symbol bits are individually estimated by a trellis algorithm over the correlation function using the corresponding bits of each data symbol for each trellis pass. A comparison of the number of trellis states $n_t$ for the symbol and bit algorithms is given in 1, 2 in equations (9). This number $n_t$ of trellis states is required to support each step k of the trellis demodulation and there are $n_p$ demodulation steps in each data symbol interval $T_s$ which means the number of trellis states per $T_s$ second interval is equal to $n_p n_t$. The number of trellis states requires a SR length $2n_p-2$ and is equal to $n_s{}^\wedge(2n_p-2)$ whereas the number of trellis paths requires a SR length $2n_p-1$ and is equal to $n_s{}^\wedge(2n_p-1)$. The computational complexity of a trellis algorithm is driven by the number of trellis states.

Number of trellis states $n_t$ (6)

1 Trellis symbol algorithm trellis states $$n_t = n_s{}^\wedge(2n_p - 2)$$
$$= 2^{\wedge}b_s(2n_p - 2)$$

2. Trellis bit algorithm trellis states $$n_t = b_s 2^\wedge(2n_p-2)$$

Figure 11:
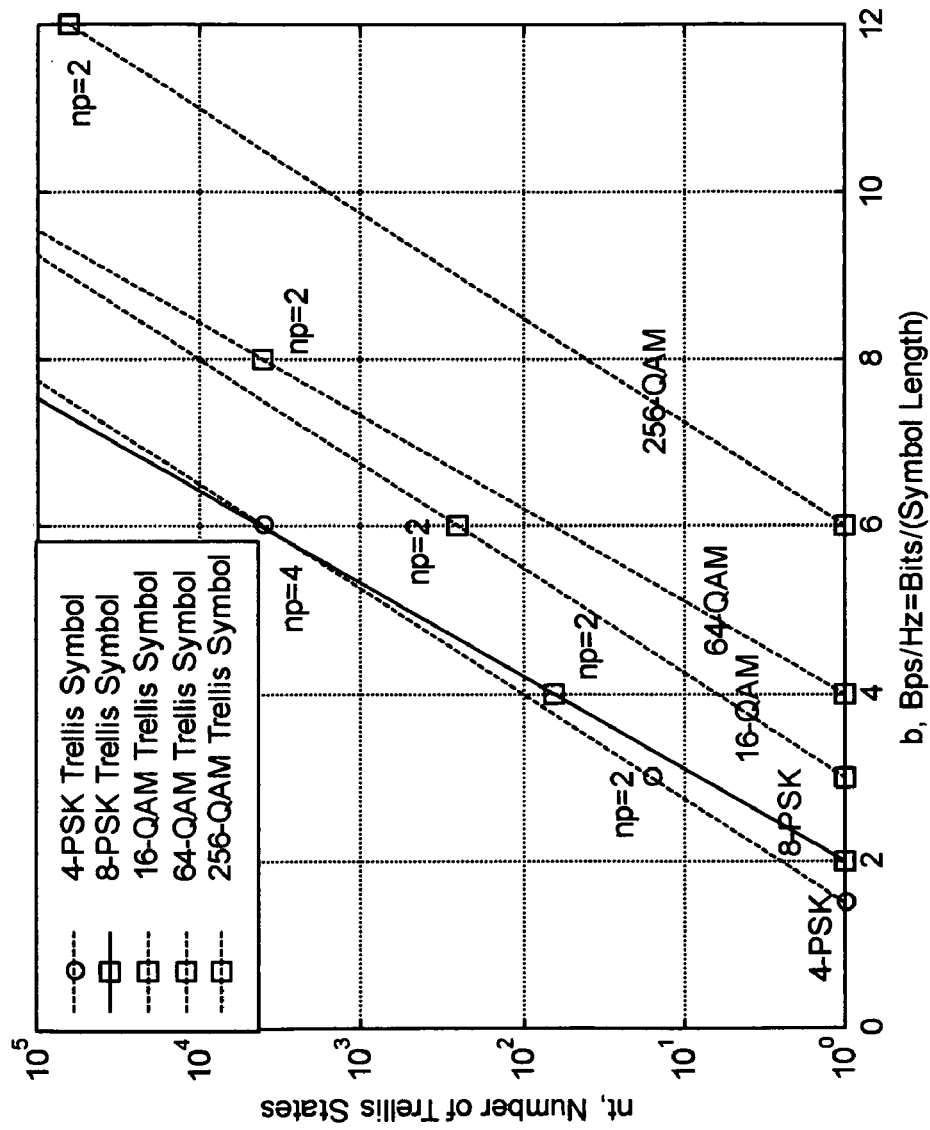
FIG. 11 plots the complexity metric of a trellis symbol demodulation algorithm vs. the information bits b.
Figure 12:
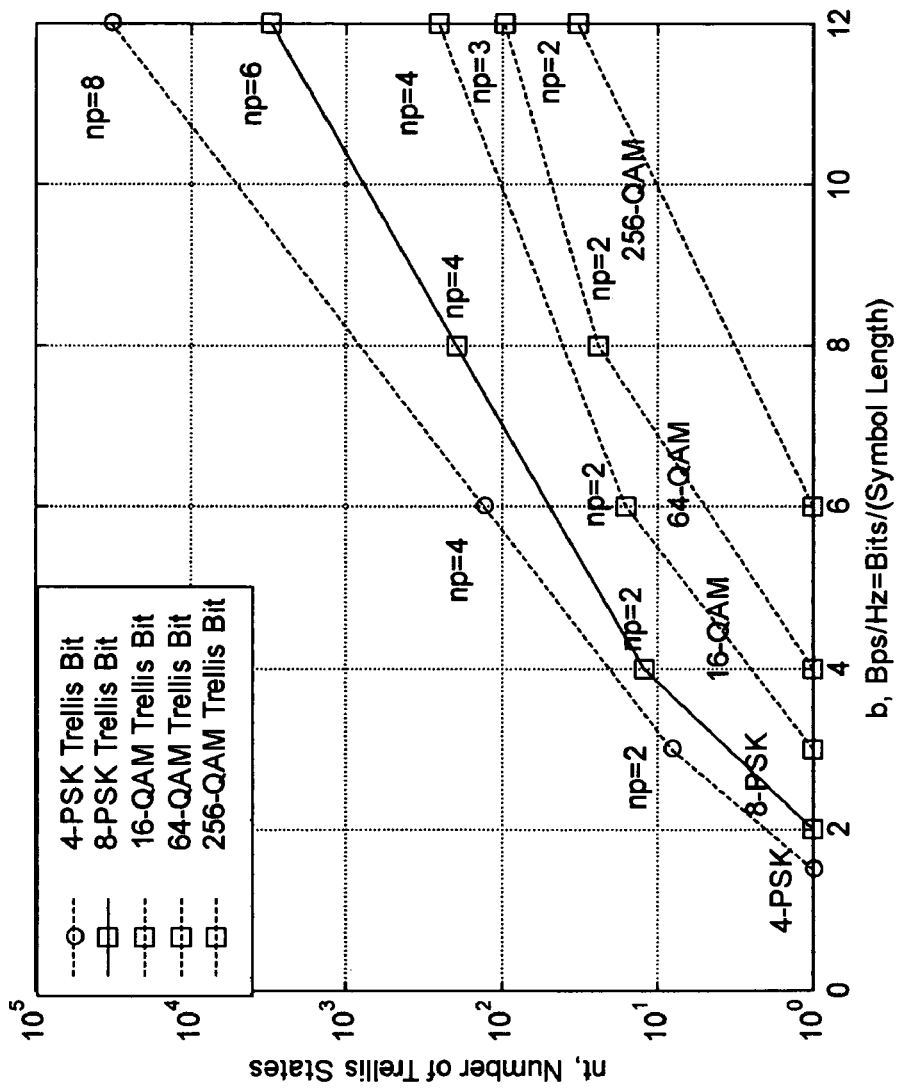
FIG. 12 plots the complexity metric of a trellis bit demodulation algorithm vs. the information bits b.
Figure 13:
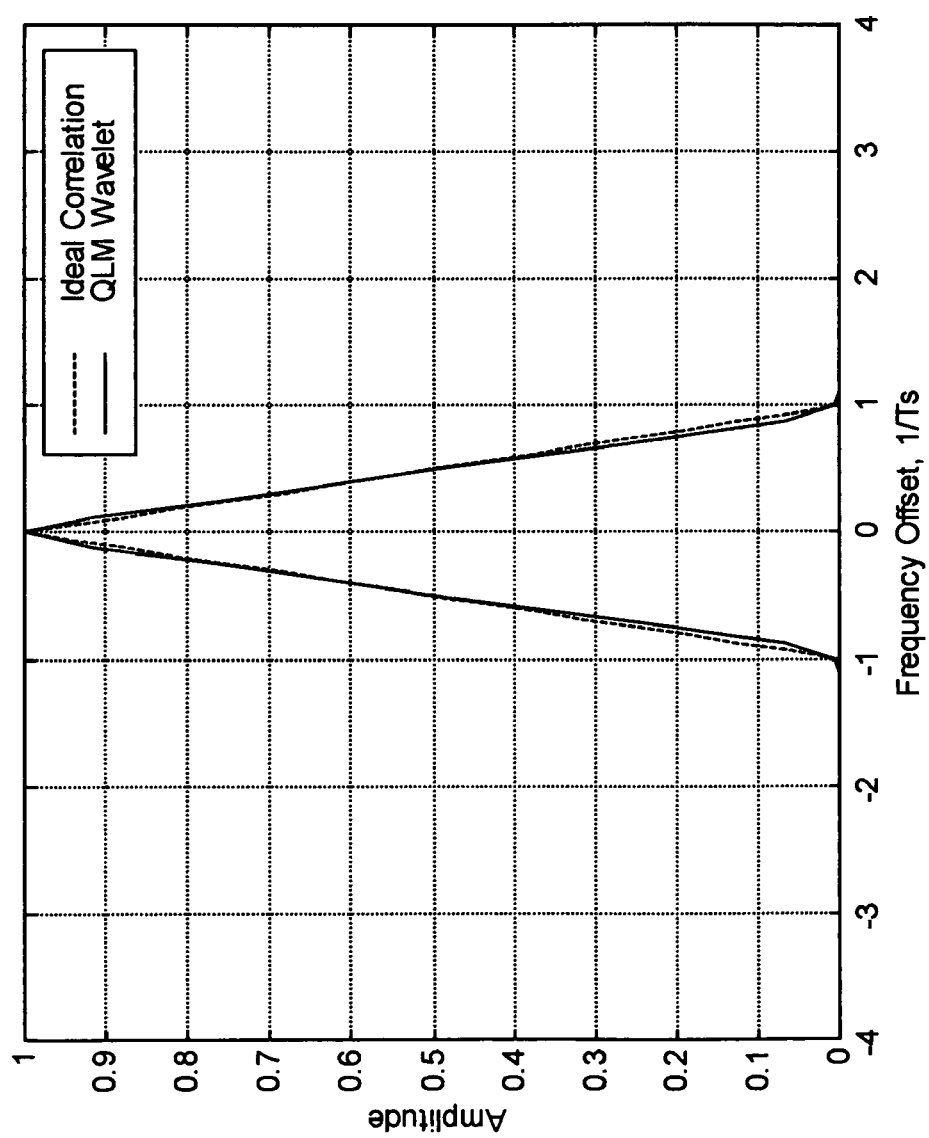
FIG. 13 plots the QLM Wavelet correlation in frequency and the ideal correlation for a pulse waveform in frequency.

FIG. 11,12 calculate the number of trellis states for the information bits per data symbol interval b values to 12 Bits/Hz=Bits/(Symbol Interval) for the trellis symbol demodulation algorithm and the trellis bit demodulation algorithm respectively using equations (9) to calculate the number of trellis states and calculating the information bits b vs. $n_p$ performance for PSK and QAM from FIG. 3,4. FIG. 11 calculates the number of trellis states for 4PSK in 200, 8PSK in 201, 16QAM in 202, 64QAM in 203, and 256QAM in 204. FIG. 13 calculates the number of trellis states for 4PSK in 205, 8PSK in 206, 16QAM in 207, 64QAM in 208, and 256QAM in 209. FIG. 12 for the trellis bit algorithm compared to FIG. 11 for the trellis symbol algorithm illustrates a reduction computational complexity using the trellis bit demodulation algorithm compared to the trellis symbol demodulation algorithm.

In FIG. 12 the number of bit passes is equal to the number of modulation bits $b_s$ per data symbol which number multiplies the number of trellis states to calculate the equivalent number of trellis states for the bit algorithm. The data symbol rate reduction required to implement the bit error correction decoding is not factored into these plots since the required code rates are expected to be relatively high and have not been established. With the bit algorithm the complexity of the data symbol modulation may require the simultaneous demodulation of more than one bit for each data symbol in order to reduce the bit(s) decisioning loss and this could increase the complexity of the bit algorithm. Also not factored into these plots is the impact of the differences in the $n_p$ over the $T_s$ interval for the same values of b since the number of data symbol modulations is equal to $n_p n_t$ over a $T_s$ interval for the same values of b.

A method to reduce the computational complexity of trellis algorithms is to reduce the number of trellis states by eliminating the lower correlation values of the sidelobes and mainlobe. Another method to reduce the computational complexity is to modify the iterative algorithm to calculate the forward trellis performance using the forward half of the mainlobe and followed by a backward trellis algorithm using the other half of the mainlobe wherein the trellis algorithm in FIG. 9 is a forward algorithm and the backward algorithm simply replaces the forward recursive metric equation $\alpha_k(jx)=\alpha_{k-1}(xi)+R(jxi)$ with the backward recursive equation $\beta_{k-1}(jx)=\beta_k(xi)+R(jxi)$ and runs the trellis algorithm in reverse by proceeding with k, k−1, k−2, . . . and wherein $\beta_{l-1}(jx)$ is the backward state metric used to define the new symbol $\hat{Z}_{k-1}$ and path as described in filing Ser. No. 10/772,597. Another method to reduce the computational complexity is to change the iterative algorithm to incorporate these techniques to eliminate the trellis state and trellis paths with relatively poor performance metrics. These are examples of the various algorithms for reducing the computational complexity of trellis algorithms at the expense of reducing the demodulation performance. Sequential demodulation techniques, partial symbol and bit integration over $\Delta T_s$ intervals, and other demodulation techniques are available as potential candidates for QLM demodulation. the present invention is not intended to be limited to these QLM demodulation methods and techniques shown herein but is to be accorded the wider scope consistent with the principles and novel features disclosed herein.

Maximum likelihood ML demodulation algorithms are direct methods for recovering estimates of the transmitted data symbols in each of the correlated communications layers and with a lower computational complexity than trellis algorithms. A limitation of ML techniques is the rapid increase in demodulation loss with the number ns of data symbols being demodulated. This limitation requires ML implementation architectures to provide useful implementations with acceptable losses and low complexities. The architectures disclosed in this patent filing are useful for implementation of QLM using limited sets of contiguous filters with QLM frequency offset differentiating parameters and waveform implementations which are spread uniformly over a bandwidth and therefore generate almost ideal triangular correlation functions in frequency.

Figure 14:
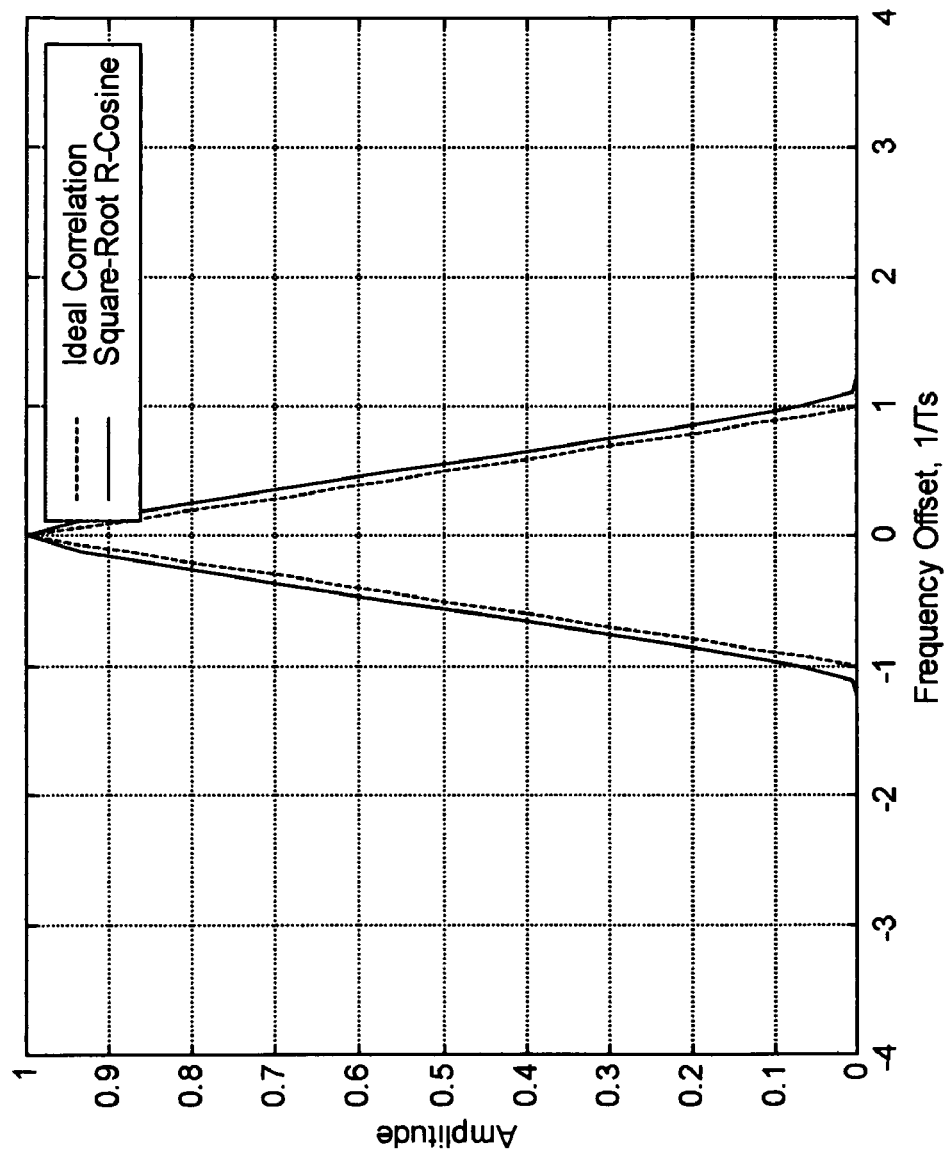
FIG. 14 plots the DFT correlation in frequency and the ideal correlation for a pulse waveform in frequency.

FIG. 13,14 calculate the correlation function in frequency for an ideal pulse (corresponding to a uniform power spectrum over the bandwidth and zero outside) in frequency and FIG. 13 calculates the correlation function for QLM Wavelet waveforms and FIG. 14 calculates the correlation function for a square-root raised cosine waveforms with excess bandwidth $\alpha=0.22$. Both waveforms closely approximate the ideal triangular correlation function and accordingly are applicable for implementing QLM ML architectures.

QLM implements signal detection to remove the waveform and recover estimates of the transmitted layered complex baseband data symbols, implements ML demodulation to recover estimates of the data symbols for each layer, and implements signal decoding to recover estimates of the transmitted data in each data symbol recovered by ML demodulation. The signal is detected by a convolution of the received signal with the complex conjugate of the transmitted data symbol waveform to generate the received Rx correlated data symbol $Y_i$ for the detected correlated data symbol indexed on i over the correlated samples in time or in frequency. Frequency indexing will be assumed for the ML demodulation architectures disclosed in this invention.

Consider a ML demodulation architecture comprising frequency channels (filters) overlapped in frequency to implement QLM communications. Each channel has the same bandwidth and data symbol rate and are synchronized in time. Data symbol waveforms are Wavelet or square-root raised-cosine or equivalent which have negligible symbol-to-symbol inter-symbol interference ISI as well as negligible channel-to-channel interference. This architecture allows the system equations to be written in equation (7) for each set of detected correlated data symbols for the QLM correlated channels and this enables a ML demodulation algorithm to be implemented to recover the estimates of the data symbols (set of data symbols) for each channel. This ML demodulation is performed for each set of data symbols over the communications signal length. System equations for each set of detected data symbols from the layered (overlapped) frequency channels are defined in equations (7) as a vector equation which calculates the received Rx detected data symbol vector Y as a linear sum of the transmitted Tx data symbol vector X multiplied by the correlation matrix H plus the Rx noise vector N. We find Rx detected data symbol set for QLM channels $$Y = HX + N \qquad (7)$$

where
Y=n×1 detected symbol vector
H=correlation matrix of data symbols
X=data symbol vector over layered filters (channels)
N=demodulation plus link noise
n=number of QLM channels (filters)

wherein the Rx data symbol vector Y has components $\{Y_i\}$ over the set of channels or filters indexed on "i", Tx data symbol vector X has components $\{X_i\}$ indexed over the same set of channels or filters, and Rx noise vector N has components $\{N_i\}$ indexed over the same set of channels or filters. The ML demodulation algorithm is derived in 4 in equations (8) for the system equations (7). We find ML demodulation algorithm (8)

$$1 \; ML \; \text{Cost} \; J \; = [Y - H\,X]'Q^{-1}\,[Y - H\,X]$$
$$= (-) \text{ exponent of the } ML$$
$$\text{probability density function}$$

2 ML solution $\hat{X}$ minimizes J $$\hat{X} = [H'Q^{-1}H]^{-1}H'q^{-1}Y$$

3 The noise covariance Q is $$Q = E[N \; N']$$
$$= 2\sigma^2 \; H$$

since the noise is correlated by the same filter overlap as the signal. This reduces the ML solution 2 to:

4 mL demodulation algorithm $$\hat{X} = H^{-1}Y$$

wherein H' is the conjugate transpose of H, the inverse $H^{-1}$ exists for all filings of interest, and "$2\sigma^2$" is the root-mean-square rms data symbol detection noise.

FIG. 13,14 calculate the correlation functions for the QLM Wavelet waveform channel filter and for the square-root raised-cosine waveform channel filter, along with the ideal correlation function for an ideal pulse frequency filter which has a power spectrum in frequency which is flat over the bandwidth and zero outside the bandwidth. These waveforms are observed to have almost ideal correlation functions in frequency.

Figure 15:
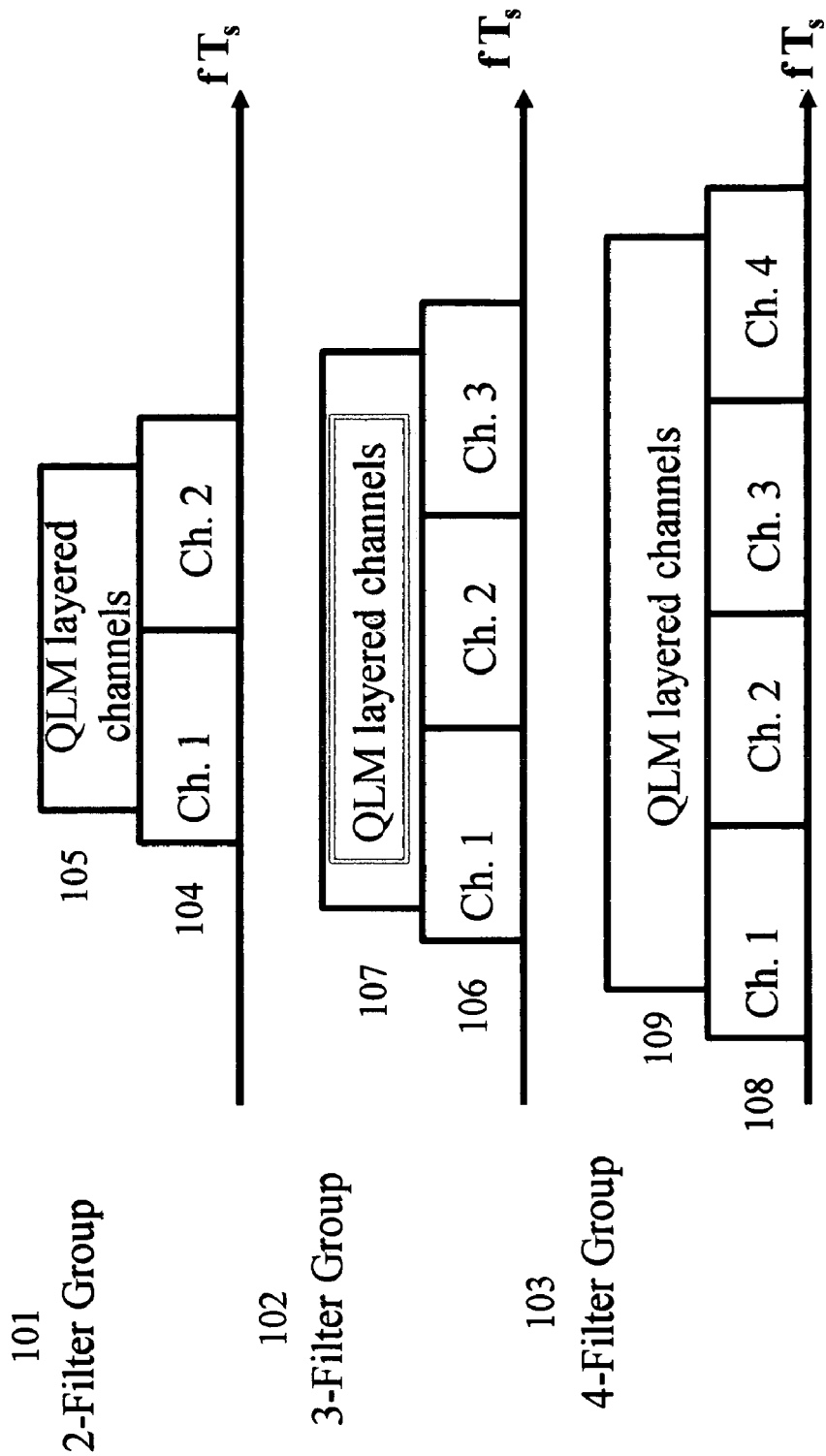
FIG. 15 describes the QLM ML 2-filter, 2-filter, 4-filter groups.

FIG. 15 presents a representative set of QLM architectures which support frequency differentiating parameters which support implementable ML demodulation algorithms with acceptable demodulation losses and with applicability to a broad spectrum of communications systems. The three architectures are a ns=2-filter (2-channel) group 101, a ns=3-filter (3-channel) group 102, and a ns=4-filter (4-channel) group 103, with each group respectively consisting of ns=2, 3, 4 contiguous channel filters 104,106,108 for the first QLM layer $n_p=1$. For this architecture the ns is the number of filters in the filter group corresponding to the absence of QLM for $n_p=1$. Notation "Ch. 1" represents channel 1 filter, et. al. QLM layers for $n_p>1$ are overlayed on each group of filters such that the additional QLM filters stay within the composite bandwidth for each filter group as illustrated in 105,107,109. This architecture enables QLM to be implemented in a communications system by using the appropriate filter groups for each of the filters or groups of filters in the system and with minimal impact on the existing architecture.

FIG. 16 defines the correlation matrix H for a ns=4-filter group with $n_p=4$ layers 110 using the ideal frequency correlation in FIG. 13, 14. There are $n_p=4$ non-zero different correlation values 1, ¾, ½, ¼ in H. The matrix reads from left-to-right for the 4-filter group 103 in FIG. 15. Note there are ns−1=3 filters (channels) used to generate the QLM layers for $n_p>1$ which means there are $(ns-1)n_p+1=13$ filters in the QLM architecture group and which means 110 H is a 13×13 correlation matrix 111.

Figure 17:
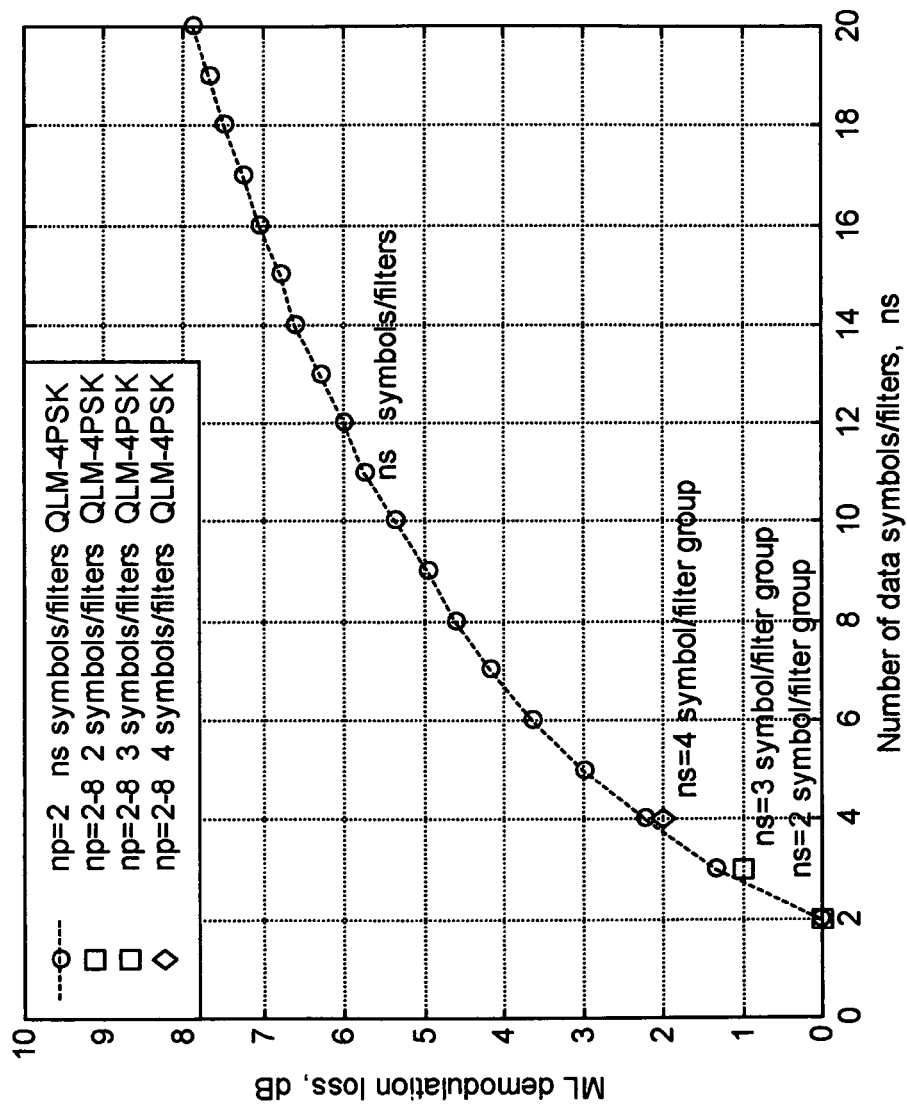
FIG. 17 plots the QLM ML demodulation loss for the number ns of data symbols or filters.

FIG. 17 measures the 4PSK ML demodulation loss using a Monte Carlo simulation for $n_p=2$ layers as a function of the number of symbols ns or filters in the group for the ideal frequency correlation in FIG. 13, 14. Overlayed are the measured losses for the 2-filter group, 3-filter group, and 4-filter group for $n_p=2, 4, 8$ QLM layers. The slight spreading of the losses over $n_p=2, 4, 8$ is not shown.

Figure 18:
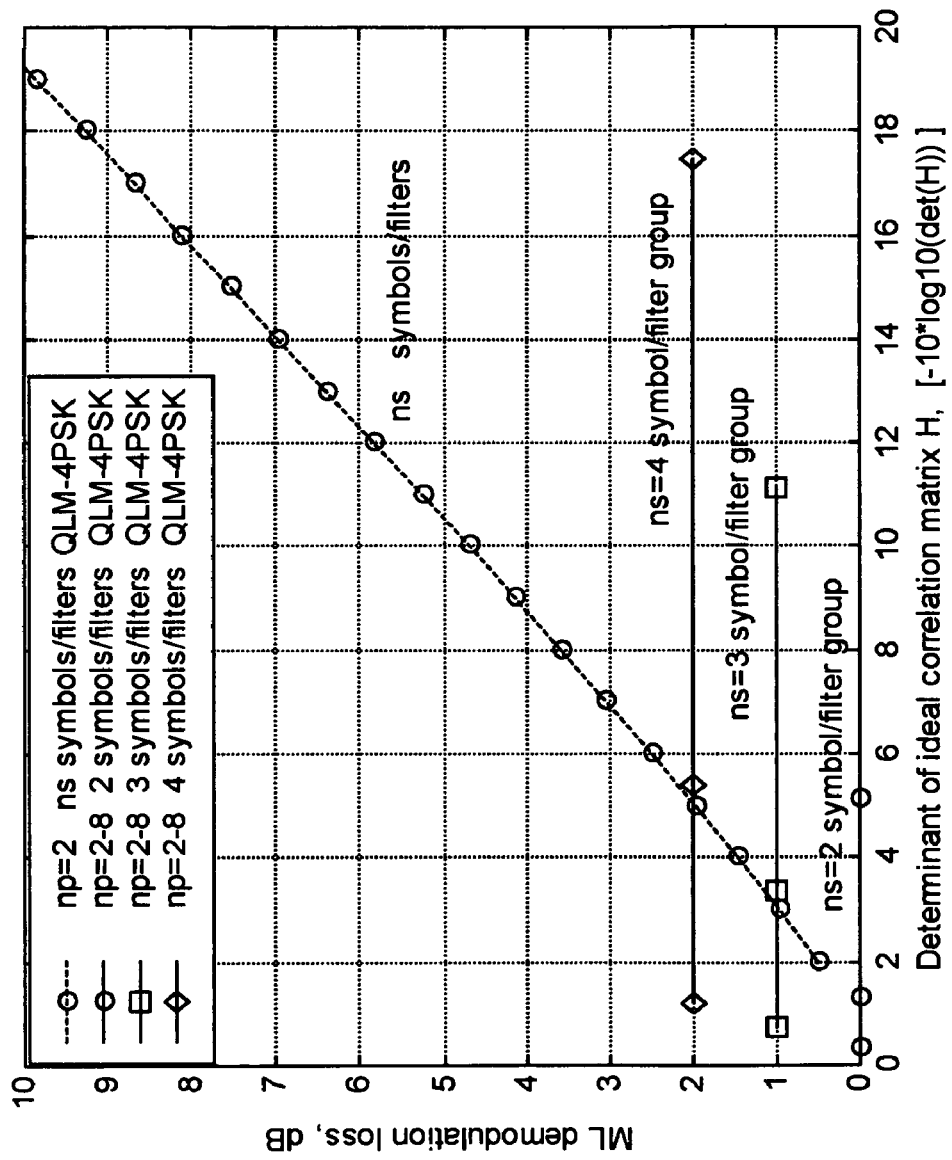
FIG. 18 plots the QLM ML demodulation loss for the (−) log 10 of the determinant of H.

FIG. 18 measures the 4PSK ML demodulation loss as a function of the negative of the logarithm to the base 10 of the determinant of H, represented by the symbol "(−) log 10(det (H))". Measured data is from the Monte Carlo simulations for FIG. 17. Overlayed are the measured values for the 2-filter group, 3-filter group, and 4-filter group for $n_p=2, 4, 8$ QLM layers.

Figure 19:
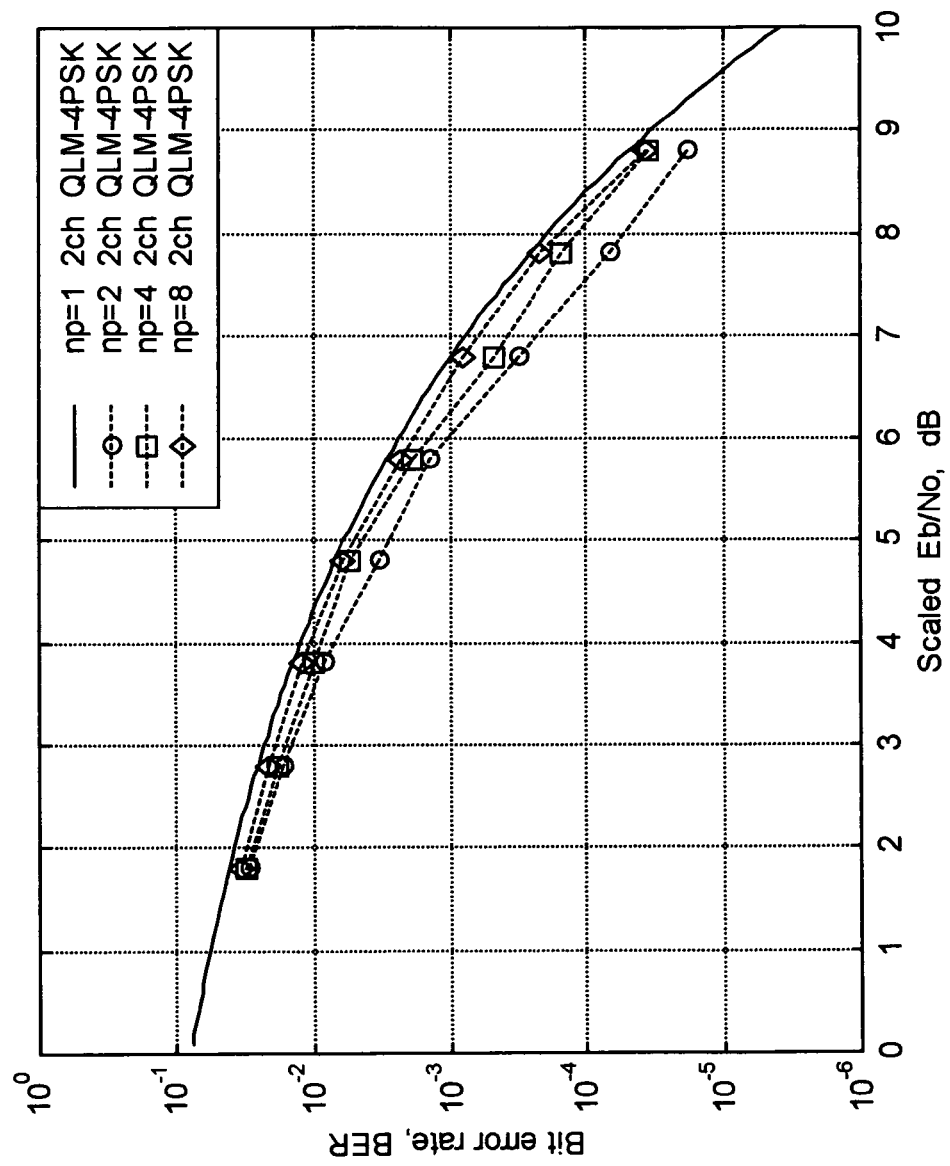
FIG. 19 plots the measured BER performance for the uncoded 4-PSK QLM 2-filter group in FIG. 15.
Figure 20:
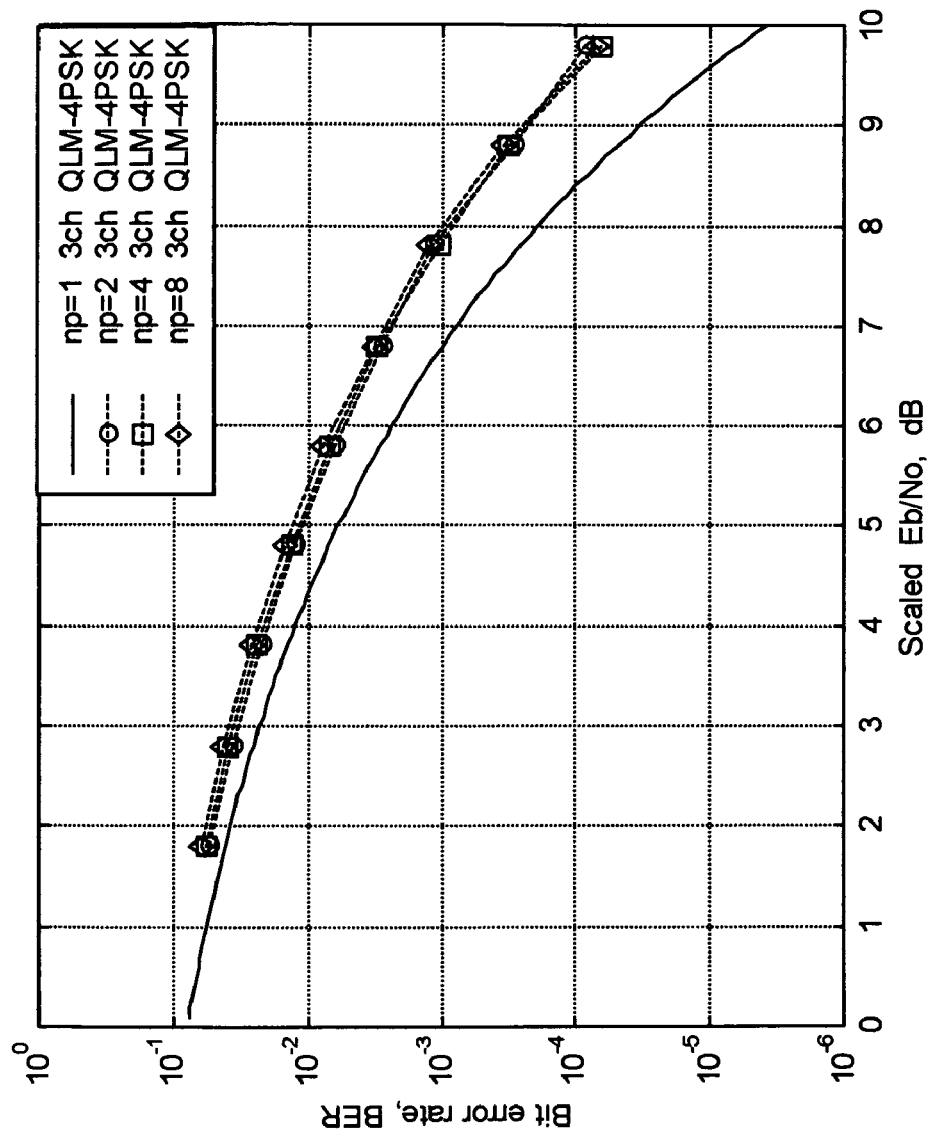
FIG. 20 plots the measured BER performance for the uncoded 4-PSK QLM 3-filter group in FIG. 15.

FIG. 19,20,21 measure the Monte Carlo BER vs. the scaled $(E_b/N_o)/n_p$ from equations (3) for 2-filter, 3-filter, 4-filter groups with $n_p=2, 4, 8$ layers using 4PSK symbol encoding and frequency filters with ideal correlations in FIG. 13,14. These BER measurements also apply to Wavelet and square-root raised cosines waveforms since their correlations closely approximate ideal correlations in FIG. 13,14. Measured BER performance losses compared to ideal 4PSK are expected to be the same for all data symbol modulations including 8PSK, 16QAM, 64QAM, 256QAM, 2048QAM since the ML demodulation estimates the data symbols in each layer independent of the data symbol modulation. The 4PSK modulation was used as a convenient modulation to measure the ML demodulation loss which loss is expected to apply to all data symbol modulations.

Similar results to the measurements in FIG. 19,20,21 are expected with other non-ideal filter waveforms whose correlation functions differ from the near ideal correlation functions in FIG. 13,14 and whose waveforms may exhibit intersymbol interference ISI, adjacent channel interference ACI, and other non-orthogonal impacts. The same ML demodulation algorithm in 4 in equations (8) derives estimates of the detected data symbols using additional signal processing when necessary to reduce the non-orthogonality impacts of the received data symbol waveforms, prior to data detection and error correction decoding of the detected data, as well as other possible signal processing including de-interleaving and de-formatting.

Figure 21:
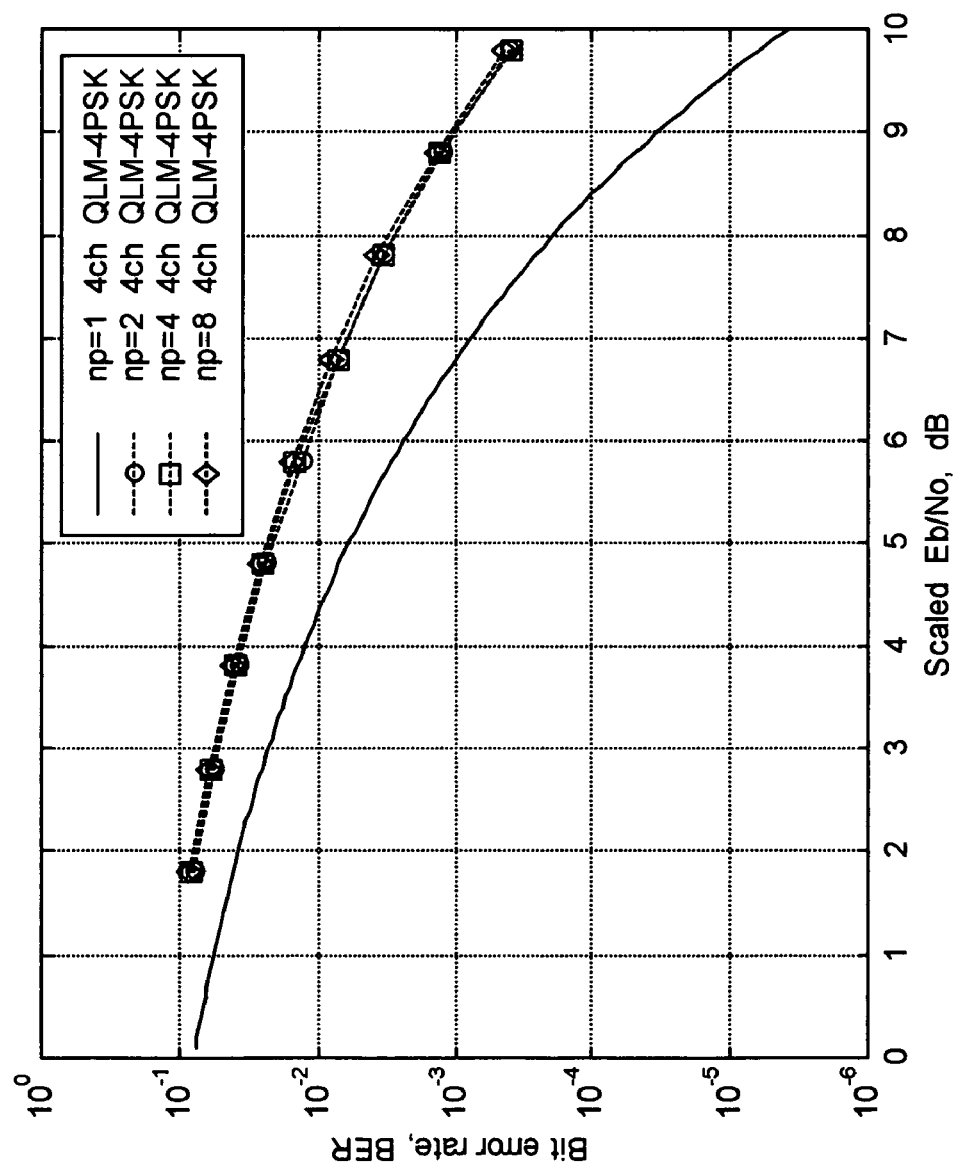
FIG. 21 plots the measured BER performance for the uncoded 4-PSK QLM 4-filter group in FIG. 15.
Figure 22:
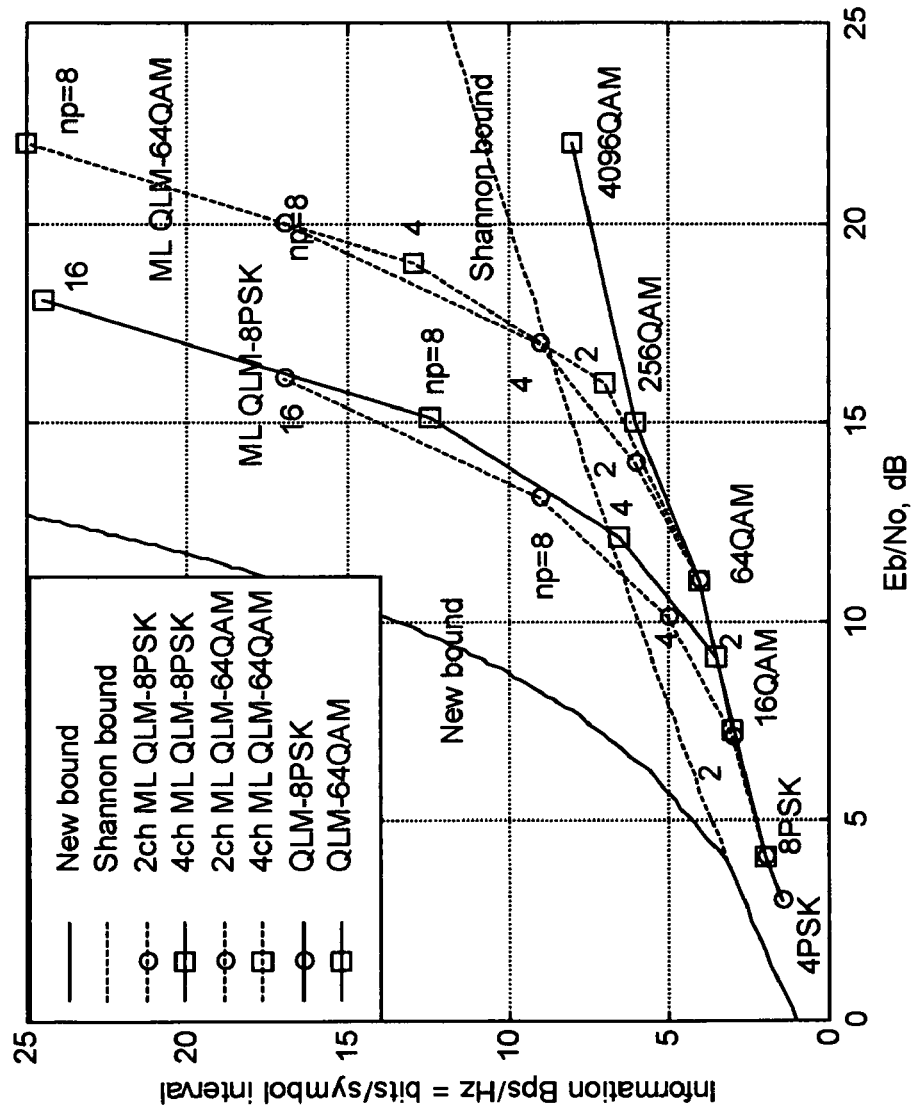
FIG. 22 plots the QLM ML b vs. $E_b/N_o$ for the 2-filter and 4-filter groups.
Figure 23:
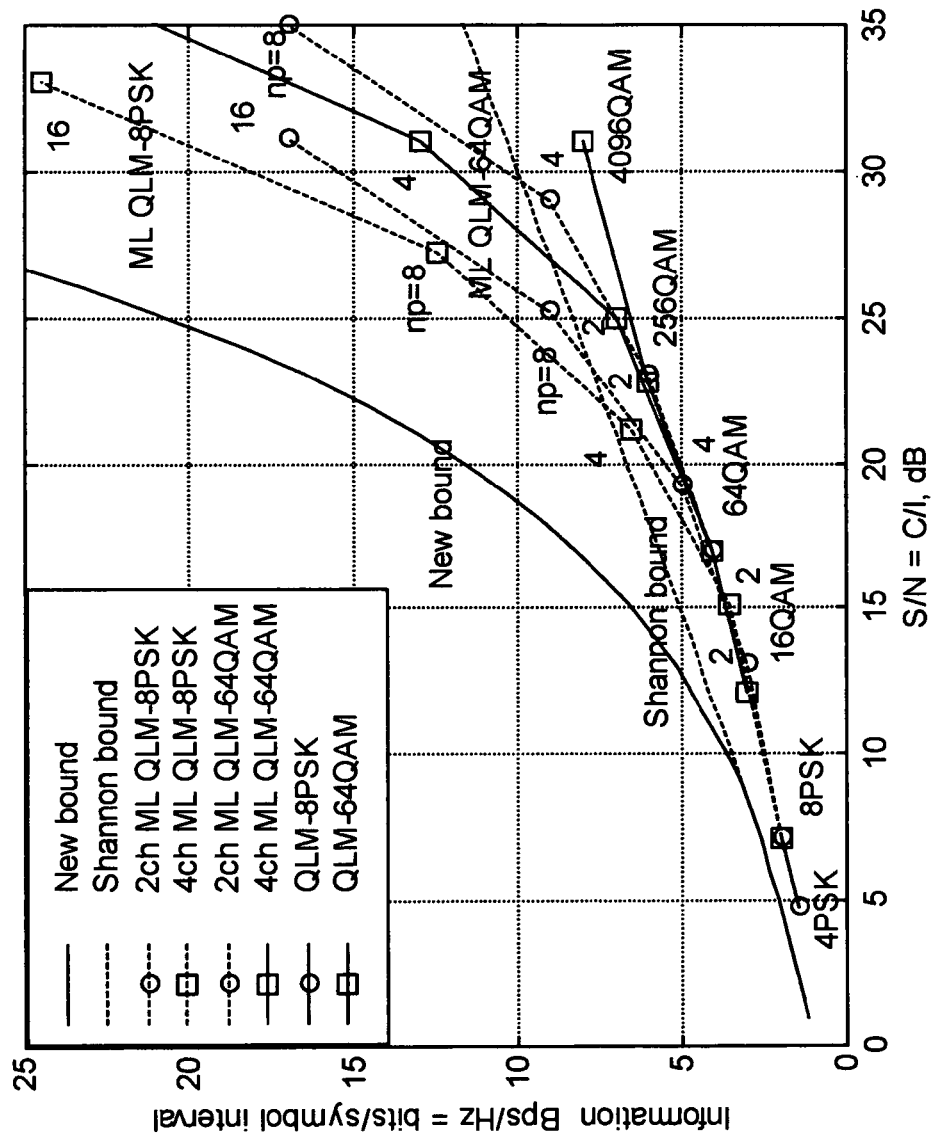
FIG. 23 plots the QLM ML b vs. S/N=C/I for the 2-filter and 4-filter groups.

FIG. 22,23 estimate the QLM $E_b/N_o$ and S/N performance for 2-filter and 4-filter groups for 8PSK and 64QAM, calculate the QLM bound, and present the data base for PSK and QAM modulations. Performance metrics are the required $E_b/N_o$ and S/N to provide the information bit rate b=Bps/Hz= (information bits)/(data symbol interval $T_s$ in each layer) at BER=$10^{-6}$ with modest complexity turbo decoding, for the data symbol modulation, for the QLM bound, and for QLM layering of the data symbol modulation. For 8PSK the QLM extension labeled "QLM-8PSK" of 8PSK implements 2-filter and 4-filter groups to increase the information b by using $n_p$=2, 4, 8, 16 QLM layers. The corresponding required increase $\Delta E_b/N_o$, $\Delta$S/N in $E_b/N_o$, S/N from the scaling laws in equations (3) is $\Delta E_b/N_o$=3, 6, 9, 12 dB, $\Delta$S/N=6, 12, 18, 24 dB for the 2-filter group and for the 4-filter group this increase is $\Delta E_b/N_o$=5, 8, 11, 14 dB, $\Delta$S/N=8, 14, 20, 26 dB including the 2 dB loss in FIG. 21. For 64QAM the QLM extension labeled "QLM-64QAM" of 8PSK implements 2-filter and 4-filter groups to increase the information b by using $n_p$=2, 4, 8 QLM layers. The same rules for QLM-8PSK apply to QLM-64QAM to estimate the performance metric b vs. $E_b/N_o$, S/N.

FIG. 22,23 demonstrate the WiFi and WiMax maximum data rates which use 256QAM to provide b=6 Bps/Hz can be doubled to b=12 Bps/Hz without an increase in $E_b/N_o$ when implementing a QLM-8PSK mode. A quadrupled data rate from b=6 Bps/Hz to b=24 Bps/Hz requires a 4 dB increase in $E_b/N_o$ when implementing a QLM-8PSK mode.

Figure 24:
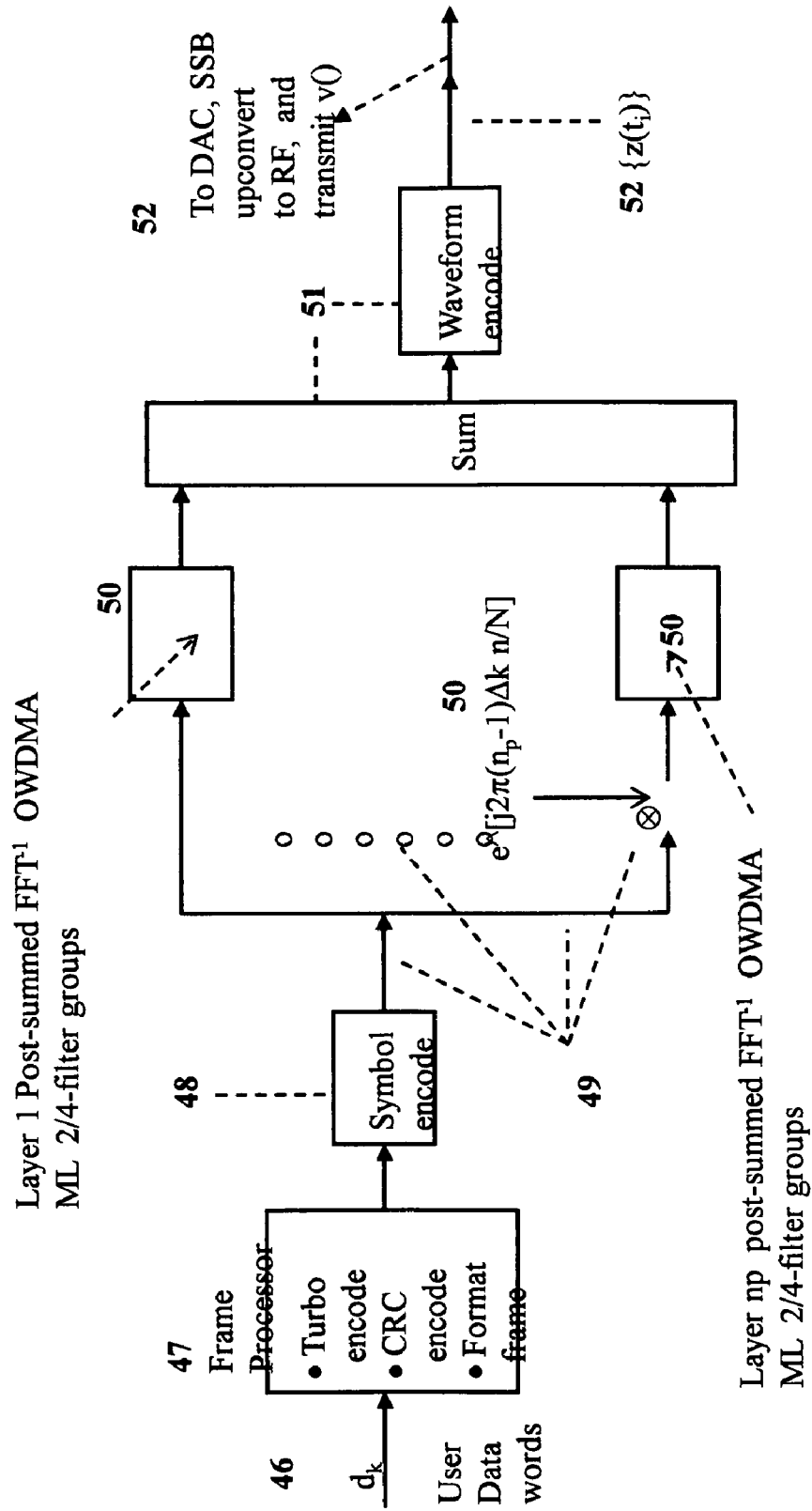
FIG. 24 is a representative transmitter implementation block diagram for the OFDMA QLM ML mode.

FIG. 24 is an OFDMA transmitter block diagram modified to support a QLM mode "OFDMA QLM" with frequency offsets using 2-filter and 4-filter QLM ML groups to increase the symbol transmission rate and with an increase in transmitter power to support this increased data rate. Ideal OFDMA uses an N-point inverse fast Fourier transform FFT$^{-1}$ on N input data symbols at the sample rate $1/T_s$ over the time interval $NT_s$. Data symbol output rates are $1/NT_s$ and the N channels have a total symbol rate equal to $N/NT_s$=$1/T_s$= (Nyquist sample rate) assuming the bandwidth B=$1/T_s$. Signal processing starts with the stream of user input data words $\{d_k\}$ 46 with k indexed over the words. Frame processor 47 accepts these data words and performs turbo error correction encoding, error detection cyclic redundant coding CRC, frame formatting, and passes the outputs to the symbol encoder 48 which encodes the frame data words into data symbols and prior to handover to the signal processing 49 the data symbols are encoded with multi-scale encoding MS using complex Walsh codes. MS and complex Walsh codes are defined in FIG. 28,29. This data symbol encoding for the QLM ML mode replaces "flash" encoding for OFDMA. It is instructive to consider the signal processing 49 for a WiFi OFDMA in FIG. 25.

Figure 25:
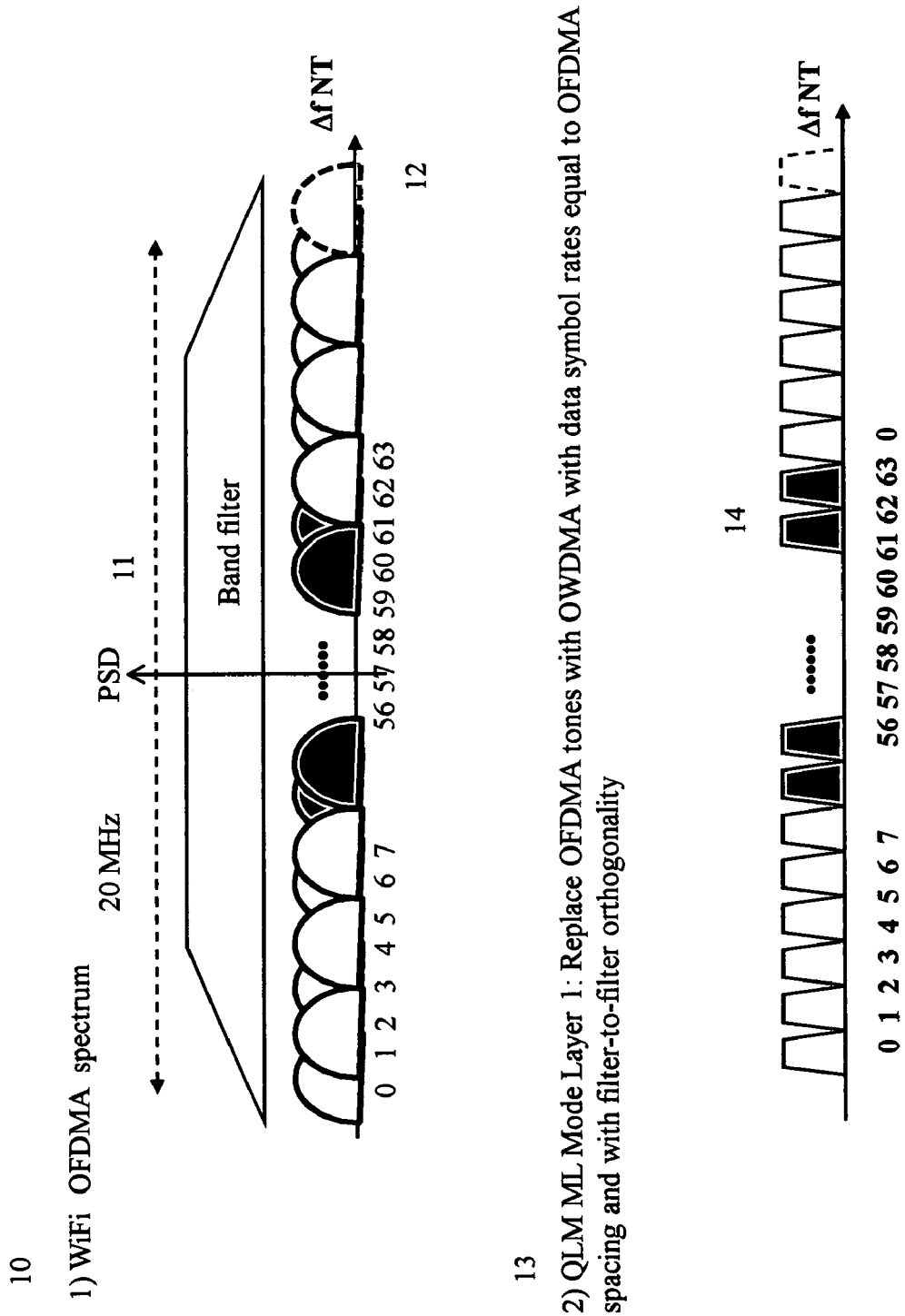

FIG. 25 is a WiFi OFDMA implementation of the OFDMA QLM ML mode layer 1. For layer 1 the OFDMA data symbol tones 12 are replaced by subband filters 14 at the tone frequencies, at the tone separations, and with data symbol rates equal to the tone transmission rate equal to $1/NT_s$. Plotted are the N=64 point FFT$^{-1}$ power spectrum 10 over the 20 MHz frequency band 11 for WiFi. The band filter 11 confines the WiFi to the assigned band and the N=64 filters 12 comprise 48 data filters which are shaded and 4 pilot tone assignments. This leaves 6 unassigned tones on each end. The QLM ML mode 13 is an orthogonal Wavelet division multiple access OWFDMA filter bank constructed with a QLM Wavelet waveform and implemented with an efficient post-summed FFT$^{-1}$ algorithm disclosed in Ser. No. 12/152,318 to generate these contiguous Wavelet subbands. The same data and tone assignments are used for the QLM ML mode subbands 14. QLM ML implementation can assign 12 groups of 4-filters for the data and 2 groups of 2-filters for the tones. Each subsequent layer implements an OFDMA subband filter bank at the appropriate frequency offset and with the deletion or puncturing of the subband filters not used in the ML filter groups. The data and tone assignments for the subsequent layers are selected to account for the impact of losing subband filters in the ML filter groups 101,105 in FIG. 15 in each layer. A computationally efficient post-summed FFT$^{-1}$ disclosed in Ser. No. 12/152,318 with the QLM Wavelets is implemented to generate the OFDMA subband filter bank for each layer.

Signal processing 49 in FIG. 24 implements 50 the WiFi QLM ML mode signal generation 13 in FIG. 25 for the first layer and modified for the subsequent layers. Each set of received data symbols assigned to the QLM layers are offset in frequency by 0, $\Delta k$, $2\Delta k$, ..., $(n_p-1)\Delta k$ with $\Delta k=1/n_p$ using the normalized frequency index k and are implemented in 49 by the frequency translation operator 50. The QLM ML signals for each layer offset in frequency and punctured to match the ML filter groups, are summed 51 and waveform encoded, the output stream of up-sampled complex baseband signal samples 52 $\{z(t_i)\}$ at the digital sample times $t_i$ with digitization index i is handed over to the digital-to-analog converter DAC, and the DAC output analog signal z(t) is single sideband SSB up-converted 52 to RF and transmitted as the analog signal v(t) wherein v(t) is the real part of the complex baseband signal z(t) at the RF frequency. Non-ideal OFDMA has a separation interval between contiguous FFT$^{-1}$ data blocks to allow for timing offsets and the rise and fall times of the channelization filter prior to the FFT$^{-1}$ processing.

FIG. 26 is a receiver block diagram modified to support OFDMA QLM from the OFDMA QLM transmitter in FIG. 24. Receive signal processing for QLM demodulation starts with the wavefronts 54 incident at the receiver antenna for the $n_u$ layers u=1, ..., $n_u \leq N_c$ which are combined by addition in the antenna to form the receive Rx signal $\hat{v}(t)$ at the antenna output 55 where $\hat{v}(t)$ is an estimate of the transmitted signal v(t) 52 in FIG. 24 that is received with errors in time $\Delta t$, frequency $\Delta f$, and phase $\Delta \theta$. This received signal $\hat{v}(t)$ is amplified and down-converted to baseband by the analog front end 56, synchronized (synch.) in time t and frequency f, waveform removed to detect the received QLM signal at the QLM symbol rate, inphase and quadrature detected (I/Q), and analog-to-digital ADC converted 57. ADC output signal is de-multiplexed into $n_p$ parallel signals 58 which are offset in frequency by 0, $\Delta k$, $2\Delta k$, ..., $(n_p-1)\Delta k$ wherein $\Delta k=1/n_p$ and processed by the pre-summed FFT OFDMA subband filter bank 58 to recover the detected correlated data symbols in each layer. Outputs are ML demodulated 59 to recover estimates of the MS encoded data symbols for each layer for each set of transmitted data symbols by implementing the ML algorithm 4 in equations (3) for the 2-filter and 4-filter groups in each layer. The MS code is removed 59 to recover the data symbols and the outputs are further processed 60,61 to recover estimates of the transmitted data.

FIG. 22,23 and the implementation in FIGS. 27-31 demonstrate that a 4-filter group CDMA QLM ML mode with $n_p$=8 layers and either 8PSK or 64QAM data symbol modulation, can generate 6 sets of N-chip MS-CDMA channels and requires a 11 dB increase in $E_b/N_o$.

FIG. 27 is a CDMA transmitter block diagram modified to support a QLM mode "CDMA QLM" with frequency offsets using 2-filter and 4-filter QLM ML groups to increase the symbol transmission rate and with an increase in transmitter power to support this increased data rate. Ideal CDMA encodes each of N data symbols with a Walsh orthogonal code row vector from a N×N Walsh code matrix, sums the Walsh encoded data symbol vectors to yield a N symbol CDMA signal vector, waveform encodes the N component symbols, and transmits this CDMA signal over the frequency band of the waveform. CDMA QLM signal processing starts with the stream of user input data words $(d_k)$ 101 with k indexed over the words. Frame processor 102 accepts these data words and performs the turbo error correction encoding, error detection cyclic redundant coding CRC, frame formatting, and passes the outputs to the symbol encoder 103 which encodes the frame data words into data symbols and performs multi-scale CDMA encoding MS-CDMA of the data symbols using complex Walsh codes defined in FIG. 28,29, prior to handover 104 to the CDMA QLM ML signal processing 105. It is instructive to consider the ideal CDMA multi-scale OWDMA signal processing in FIG. 28,29,30 for layer 1.

FIG. 28 discloses a complex Walsh code and a generalized complex Walsh code which are used to implement the CDMA QLM mode. The complex Walsh will also refer to the generalized complex Walsh. An example of the complex Walsh code disclosed in U.S. Pat. Nos. 7,277,382, 7,352,796 is defined in FIG. 28 which defines 150 the complex N chip Walsh code vector $\underline{W}(c)$ indexed on c=0, 1, ..., N−1 as a linear sum of the real code vector W(cr) lexicographically reordered by the index cr and the real code vector W(ci) used as the complex orthogonal component lexicographically reordered by the index ci and wherein the notation 1:N/2 is the Matlab notation for indexing 1, 2, 3 ..., N/2. This reordering of the even and odd Walsh vectors to yield the complex Walsh code vectors is in 1-to-1 correspondence with the generation of the complex discrete Fourier transform DFT codes by the reordered even and odd real DFT codes used for the real and imaginary complex DFT code components. An 8×8 complex Walsh code matrix $\underline{W}_8$ in 151 is rotated by 45 degrees so the axes are aligned with the complex coordinates. The generalized complex Walsh 154 is a tensor product with one or more orthogonal matrices which include the DFT, real Walsh, complex Walsh, and other codes. A motivation for the generalized Walsh is to obtain complex orthogonal codes with a greater flexibility in choosing the length N.

FIG. 29 discloses an "MS-CDMA" code which is an MS code using complex Walsh codes which is used to implement the CDMA QLM mode. The MS-CDMA for QLM layer 1 is used to define the MS-CDMA. MS-CDMA 101 maps the encoded CDMA chips onto a frequency-time "f-t" partitioning 105 of the CDMA band into $N_1$ subbands 104 by an OWDMA Wavelet filter bank or an equivalent filter bank, with each subband supporting an $N_0$ chip CDMA code component 103 for an $N=N_0 N_1$ chip MS-CDMA complex Walsh code. MS-CDMA code and chip indexing in 102 illustrates the construction of an MS-CDMA code as the scaled algebraic sum of the code fields for the user and chip indices over the communication elements being encoded. In this example the communication elements are the CDMA frequency band and the individual subbands. This algebraic architecture uniformly spreads each user data symbol uniformly over each member of each set of communication elements. Jensen's inequality guarantees MS-CDMA provides the best communications performance. For layers the same construction applies with the modification that some of the subband filters in the OWDMA filter bank are deleted or punctured as required by the ⅔-filter groups.

FIG. 30 illustrates the construction of the OWDMA filter bank to occupy the CDMA frequency band for layer 1. An ideal CDMA frequency band 20 is illustrated in 21. An MS-CDMA filter bank 22 partitions the CDMA frequency band into $N_1$ subbands 23 with each subband encoded with $N_0$ chips of the $N=N_0 N_1$ MS-CDMA code. For layers 2,3, ..., $n_p$ as noted in FIG. 29, some of the subband filters are deleted or punctured as required by the 2/4-filter groups. Similar to the implementation of the OWDMA for OFDMA in FIG. 24, a computationally efficient post-summed $FFT^{-1}$ using a Wavelet waveform is implemented to generate the OWDMA subband filter bank for each layer 106 in FIG. 27.

Signal processing 103-105 in FIG. 27 implements the MS-CDMA encoding of the data symbols in FIG. 28,29 followed by OWDMA implementation of the encoded data symbols in FIG. 30 for the first layer and for the subsequent layers. Each set of received MS-CDMA encoded data symbols assigned to the QLM layers are offset in frequency by 0, $\Delta k$, $2\Delta k$, ..., $(n_p-1)\Delta k$ with $\Delta k=1/n_p$ using the normalized frequency index k and are implemented in 105 by the frequency translation operator. The output streams of the encoded 105 symbols for the $n_p$ frequency offsets are summed 106 and waveform encoded and the up-sampled output stream of complex baseband signal samples 107 $\{z(t_i)\}$ at the digital sample times $t_i$ with digitization index i, is handed over to the DAC and the DAC output analog signal z(t) is SSB up-converted 107 to RF and transmitted as the analog signal v(t) wherein v(t) wherein v(t) is the real part of the complex baseband signal z(t) at the RF frequency.

FIG. 31 is a receiver block diagram modified to support CDMA QLM ML mode signaling from the CDMA QLM ML mode transmitter in FIG. 27. Receive signal processing for QLM demodulation starts with the wavefronts 121 incident at the receiver antenna for the $n_u$ users u=1, ..., $n_u \leq N_c$ which are combined by addition in the antenna to form the receive Rx signal $\hat{v}(t)$ at the antenna output 122 where $\hat{v}(t)$ is an estimate of the transmitted signal v(t) 107 in FIG. 27 that is received with errors in time $\Delta t$, frequency $\Delta f$, and phase $\Delta \theta$. This received signal $\hat{v}(t)$ is amplified and downconverted to baseband by the analog front end 123, synchronized (synch.) in time t and frequency f, waveform removed to detect the received QLM signal at the QLM symbol rate, inphase and quadratue detected (I/Q), and analog-to-digital ADC converted 124. ADC output signal is demultiplexed into $n_p$ parallel signals 125 which are offset in frequency by 0, $\Delta k$, $2\Delta k$, ..., $(n_p-1)\Delta k$ and processed by the pre-summed FFT OWDMA subband filter bank 125 to recover the detected correlated data symbols in each layer. Outputs are ML demodulated 126 to recover estimates of the MS-CDMA encoded data symbols for each layer for each set of transmitted data symbols by implementing the ML algorithm 4 in equations (3) for the 2-filter and 4-filter groups in each layer. The MS-CDMA code is removed to recover the data symbols and the outputs are further processed 127,128 to recover estimates of the transmitted data.

FIG. 32 illustrates the implementation of a single channel 50,51 which could represent a satellite-ground channel communications link or other. It is instructive to consider this single communications channel to be an ADSL (asymmetric digital subscriber line or loop) channel 52 since the emphasis on ADSL is to support the highest data rates allowed by the channel with higher order modulations. The ADSL channel is assumed to support a 256QLM TCM (trellis coded modulation) data symbols. ADSL QLM ML mode 53,54 uses a 4-filter group, a lower order modulation 8PSK with $n_p=16$ layers, and the option of MS complex Walsh encoding of the layers to improve the BER performance. The ADSL QLM mode can increase the data rate to 4×(ADSL data rate) using performance data in FIG. 22,23 and requires a 4 dB increase in $E_b/N_o$.

FIG. 33 illustrates the implementation of a 4-filter group in a 1.25 MHz CDMA or WiFi channel 60 to support a Blu-ray disk high definition HD 25-40 Mbps streaming video for cellular filing. QLM ML filters 63 are layered over the 4-filter group 62 which partitions the 1.25 MHz frequency band 61. For CDMA this channel corresponds to 1 of 16 channels over a 20 MHz band. CDMA QLM ML uses 8PSK with $n_p=16$ layers to support a data rate equal to the $(16\times3+1)/4$ symbols, $\times1.25$ MHz ideal symbol rate, $\times2$ bits/symbol for 8PSK, which yields 30.6 Mbps. For WiFi QLM ML the 4-filter group corresponds to 4 contiguous subbands in the WiFi QLM ML mode since the 4 filters occupy $4\times20$ MHz/(64 point FFT)=1.25 MHz for a 64 point FFT WiFi over a 20 MHz band. QLM ML uses 64QAM with $n_p=8$ layers to support a data rate equal to the $(8\times3+1)/4$ symbols, $\times1.25$ MHz ideal symbol rate, $\times4$ bits/symbol for 64QAM, which yields 31.3 Mbps.

The ML modulation and demodulation architectures and algorithms and implementations and filings disclosed in this patent are examples of available ML, MAP, and other optimization architectures and algorithms to recover estimates of data symbols from layered communications channels for the plurality of applications with differentiating parameters that enable demodulation algorithms to recover estimates of the data symbols in each of the communications layers or channels. This patent covers the plurality of all of these architectures, algorithms, implementations, and filings for generation and for recovery of the data symbols in each of the communications layers as well as decoding of the data symbols.

This patent covers the plurality of everything related to QLM generation, QLM demodulation, and data recovery of QLM and to the corresponding bounds on QLM to all QLM inclusive of theory, teaching, examples, practice, and of implementations for related technologies. The representative trellis and ML algorithms for QLM demodulation are examples to illustrate the methodology and validate the performance and are representative of all QLM demodulation algorithms including all maximum likelihood ML architectures, maximum a posteriori MAP, maximum a priori, finite field techniques, direct and iterative estimation techniques, trellis symbol and iterative trellis symbol and with/without simplifications, trellis bit and iterative trellis bit and with/without simplifications and with/without bit error correction coding, and all other related algorithms whose principal function is to recover estimates of the transmitted symbols for QLM parallel layered modulation as well as data recovery related to QLM and the QLM bounds.

Preferred embodiments in the previous description of modulation and demodulation algorithms and implementations for QLM for the known modulations and demodulations and for all future modulations and demodulations, are provided to enable any person skilled in the art to make or use the present invention. The various modifications to these embodiments will be readily apparent to those skilled in the art and the generic principles defined herein may be applied to other embodiments without the use of the inventive faculty. Thus, the present invention is not intended to be limited to the embodiments shown herein but is to be accorded the wider scope consistent with the principles and novel features disclosed herein. Additional filings for QLM signal processing and bound include the plurality of information theoretic filings with examples being radar, imaging, and media processing.

What is claimed is:

1. A method for implementation of Quadrature Parallel Layered Modulation (QLM) for communications over multiple channels, said method comprising the steps:

consider a first set of $n_p$ QLM channels starting with a first channel in the set;

generating a first communications signal over a frequency bandwidth B at the carrier frequency $f_{1,0}$ for a first channel by modulating a first stream of data symbols with a waveform;

generating a second communications signal over a frequency bandwidth B at an offset carrier frequency $f_{1,1}=f_{1,0}+B/n_p$ for a second channel by modulating a second stream of data symbols with the same waveform at the same symbol rate and timing as the first stream of data symbols wherein "$n_p$" is the number of QLM channels overlapping in frequency;

for any additional channels in the first set, continuing generation of communication signals over a frequency bandwidth B at an offset carrier frequency by modulating additional streams of data symbols with the same waveform at the same data symbol rate and timing as the first and second streams of data symbols, with frequency offsets increasing in each communication channel in increments of $\Delta f=B/n_p$ until the $n_p$ signals are generated for the $n_p$ QLM channels in the first set;

continuing this generation of $n_p$ QLM channels for (ns−1) sets;

for (ns−1)>0 generate a second set of $n_p$ QLM channels starting with a first channel in the set at bandwidth B with center frequency $f_{2,0}=f_{1,0}+B$;

repeating the generation of $n_p$ communications channels for the second set with each channel offset in frequency in increments of $\Delta f=B/n_p$ relative to the first channel;

repeating the generation of $n_p$ QLM channels for any additional set;

after the last set ns−1 of $n_p$ QLM channels one can add another first channel at the center frequency $f_{ns,0}=f_{1,0}+$ (ns−1)×B wherein "x" is a multiply operation;

transmitting and receiving said communications signals over a QLM communications link consisting of (ns−1)× $n_p$+1 or (ns−1)×$n_p$ QLM channels when another channel is added or not added, recovering data symbols of the communications signals in a receiver using a demodulation algorithm, and combining said algorithm with error correction decoding to recover the transmitted information; whereby frequency offsets have been used as a differentiating parameter to enable QLM parallel channels of communications over a frequency bandwidth ns×B or (ns−1)×B with a data symbol rate which could be above the Nyquist rate, to be demodulated.

2. The method of claim 1 wherein the communications signals have the following properties:

$E_b/N_o$ is the ratio of energy per information bit $E_b$ to the noise power density $N_o$ and is scaled by the number of QLM layers $n_p$ to derive the value $[E_b/N_o]=E_b/N_o/n_p$ required to support the same bit-error-rate BER as a single layer with $E_b/N_o=[E_b/N_o]$;

S/N is the ratio of signal power S to the noise power N and is scaled by the square of the number of QLM layers $n_p$ to derive the value $[S/N]=S/N/n_p\hat{}2$ required to support the same BER as a single layer with S/N=[S/N];

these scaling laws are bounds on the QLM performance and which bounds are closely approximated by the QLM demodulation performance, and these scaling laws when combined with data symbol modulation and measured BER performance enable estimation of the number of bits "b" per symbol interval as a function of $E_b/N_o$ and S/N for the postulated data symbol modulation.

3. The method of claim 1, wherein the symbol demodulation is implemented with a maximum likelihood (ML) algorithm, comprising the steps of:

transmitting a QLM communications signal overlayed with $n_p$ layers over (ns−1) contiguous channels as described in claim 1 to yield n=(ns−1)×$n_p$+1 or n=(ns−1)×$n_p$ QLM channels when another channel is added or not added;

processing the received QLM communications signal to recover the detected correlated data symbols for each set of n transmitted data symbols in the n channels;

measuring the n×n correlation matrix H whose elements are the correlation coefficients between the data symbols in the n channels or filters;

evaluating the estimated data symbol vector X for each observation vector Y by implementing the ML solution X=$H^{-1}$Y wherein $H^{-1}$ is the matrix inverse of H and wherein the elements of the n×1 vector X are the estimated data symbols in the n channels or filters, the elements of the n×1 vector Y are the detected correlated data symbols in the n channels, and this ML solution is repeated for each set of n received correlated data symbols in the channels, and combining the ML algorithm with error correction decoding to recover the transmitted information.

4. A method for implementation of a WiFi mode for communications using a WiFi QLM layered modulation in a transmitter and a ML demodulation of the transmitted WiFi QLM signal in a receiver, comprising the steps of:

replacing the N point inverse fast Fourier transform $FFT^{-1}$ orthogonal frequency division multiple access OFDMA data symbol modulated tones with a first QLM layer using an N subband orthogonal Wavelet division multiple access OWDMA filter bank or an equivalent filter bank which modulates the data symbols by the data and control subbands, and which comprises N subband filters at the OFDMA tone frequencies with data symbol rates in each subband equal to OFDMA tone spacing, with subband-to-subband orthogonality, and with the same subband data and control assignments as OFDMA tones;

selecting an equivalent or a lower order data symbol modulation than used for WiFi to take advantage of the layering impact in increasing the data rate;

partitioning the first layer of data and control filters into ns=2-filter and ns=4-filter groups wherein ns−1 filters are overlayed in each ns-filter group with $n_p$−1 filters;

generating a second layer of N subband filters with a frequency offset Δf=(1/$NT_s$)/$n_p$ and overlaying over the previous set of N subband filters wherein 1/$NT_s$ is the tone-to-tone and subband-to-subband separation, 1/$T_s$ is the sample rate of the inverse $FFT^{-1}$ and FFT, and the N subbands are punctured or deleted where required by the noncontiguous mapping of the layering onto the ns-filter groups;

for any additional layers, continuing generation of N subband filters with frequency offsets increasing in increments of Δf=(1/$NT_s$)/$n_p$ and overlaying on the ns-filter groups in the previous layers until the $n_p$ layers are generated with each group comprising n=(ns−1)×np+1 subband filters or channels;

transmitting the WiFi QLM layered communications signal in a communications transmitter;

receiving the communications signal in a receiver and processing said signal to recover the WiFi QLM layered communications signal;

implementing the N subband filter layering to detect the correlated data symbols in each of the ns-filter groups for the data and control subbands wherein the elements of the n×1 vector Y are the detected symbols in each ns-filter groups;

measuring the n×n correlation matrix H for each set of detected correlated data symbols in each ns-filter group;

implementing a ML demodulation algorithm by solving the ML equation X=$H^{-1}$Y for the estimated data symbols in each ns-group, and combining said algorithm with error correction decoding to recover the transmitted information.

5. A method for implementation of a CDMA mode for communications using a CDMA QLM layered modulation transmitter and a ML demodulation of the transmitted CDMA QLM signal in a receiver, comprising the steps of:

replacing the N chip CDMA frequency band B with a first QLM layer using an $N_1$ subband orthogonal Wavelet division multiple access OWDMA filter bank or an equivalent filter bank with subband data symbol rates equal to subband filter spacing B/$N_1$ and with subband-to-subband orthogonality;

selecting a data symbol modulation for transmission to take advantage of the layering impact in increasing the data rate;

replacing the N chip CDMA code with an N chip multiscale (MS) complex Walsh code or generalized complex Walsh code with N=$N_0 N_1$ wherein $N_0$ is the number of chips assigned to each of the $N_1$ subbands and wherein the MS code spreads each data symbol uniformly within each subband and uniformly over the subbands;

assigning the N data symbols to the N MS code vectors;

partitioning the first layer filters into ns=2-filter and ns=4-filter groups wherein ns−1 filters are overlayed in each group with $n_p$−1 filters;

generating a second layer of N subband filters with a frequency offset Δf=(B/$N_1$)/$n_p$ and overlaying over the previous set of N subband filters and the N subbands are punctured or deleted where required by the noncontiguous mapping of the layering onto the ns-filter groups as recited in claim 4;

for any additional layers, continuing generation of N subband filters with frequency offsets increasing in increments of Δf=(B/$N_1$)/$n_p$ and overlaying on the previous layers until the $n_p$ layers are generated with each group comprising n=(ns−1)×np+1 subband filters or channels;

transmitting the CDMA QLM layered communications signal in a communications transmitter;

receiving the communications signal in a receiver and processing to recover the CDMA QLM layered communications signal;

implementing the N subband filter layering to detect the correlated data symbols in each of the ns-filter groups for the data and control subbands wherein the elements of the n×1 vector Y are the detected symbols in each ns-filter group;

measuring the n×n correlation matrix H for each set of detected data symbols;

implementing a ML demodulation algorithm by solving the ML equation X=$H^{-1}$Y for the estimated data symbols in each ns-group, and combining said algorithm with error correction decoding to recover the transmitted information.

6. A method for implementation of a communications transmitter frequency channel to support a QLM layered modulation for transmission and a ML demodulation of the transmitted CDMA QLM signal in a receiver, comprising the steps of:

replacing the communications channel band B with a ns=2-filter group or ns=4-filter group of subbands partitioning the band B into ns subbands wherein ns−1 filters are overlayed with $n_p-1$ layers of filters as recited in claim 3;

using the same data symbol modulation or selecting a data symbol modulation for transmission to take advantage of the layering impact in increasing the data rate;

generating a second layer of ns−1 filters with a frequency offset $\Delta f=(B/ns)/n_p$ and overlaying over the previous set of ns filters;

for any additional layers, continuing generation of ns−1 subband filters with frequency offsets increasing in increments of $\Delta f=(B/N_1)/n_p$ and overlaying on the previous layers until the $n_p$ layers are generated for the QLM layered communications signal consisting of $n=(ns-1)\times n_p+1$ channels;

transmitting the QLM layered communications signal in a communications transmitter;

receiving the communications signal in a receiver and processing to recover the QLM layered communications signal;

implementing the ns subband filter layering to detect the correlated data symbols in each of the subbands in each layer wherein the elements of the n×1 vector Y are the detected symbols in the ns-filter group;

measuring the n×n correlation matrix H for each set of detected correlated data symbols;

implementing a ML demodulation algorithm by solving the ML equation $X=H^{-1}Y$ for the estimated data symbols in the ns-group, and combining said algorithm with error correction decoding to recover the transmitted information.

* * * * *